(12) United States Patent
Kling et al.

(10) Patent No.: US 9,639,594 B2
(45) Date of Patent: May 2, 2017

(54) COMMON DATA MODEL FOR IDENTITY ACCESS MANAGEMENT DATA

(71) Applicant: Bank of America Corporation, Charlotte, NC (US)

(72) Inventors: John H. Kling, Bellevue, KY (US); Abdulkader Barbir, Ontario (CA); Cynthia A. Frick, Newark, DE (US); Radu Marian, Indian Trail, NC (US); Ronald W. Ritchey, Centreville, VA (US)

(73) Assignee: Bank of America Corporation, Charlotte, NC (US)

( * ) Notice: Subject to any disclaimer, the term of this patent is extended or adjusted under 35 U.S.C. 154(b) by 82 days.

(21) Appl. No.: 13/801,314

(22) Filed: Mar. 13, 2013

(65) Prior Publication Data

US 2014/0181003 A1    Jun. 26, 2014

Related U.S. Application Data

(60) Provisional application No. 61/740,205, filed on Dec. 20, 2012.

(51) Int. Cl.
*G06F 17/00* (2006.01)
*G06F 17/30* (2006.01)

(52) U.S. Cl.
CPC .. *G06F 17/30592* (2013.01); *G06F 17/30563* (2013.01)

(58) Field of Classification Search
CPC .... G06F 21/10; G06F 21/31; G06F 17/30165; G06F 17/30873; G06F 17/3064
See application file for complete search history.

(56) References Cited

U.S. PATENT DOCUMENTS 5,574,927 A    11/1996  Scantlin
5,649,099 A     7/1997  Theimer et al.
(Continued)

FOREIGN PATENT DOCUMENTS

EP    0707264 A2    4/1996
JP    2003186708 A  7/2003

OTHER PUBLICATIONS

Access Requests at IAM System Implementing IAM Data Model, U.S. Appl. No. 13/945,638, filed Jul. 18, 2013.
(Continued)

*Primary Examiner* — Mariela Reyes
*Assistant Examiner* — Courtney Harmon
(74) *Attorney, Agent, or Firm* — Banner & Witcoff, Ltd.; Michael A. Springs

(57) ABSTRACT

A data model for managing identity and access management (IAM) data implemented at an electronic database may include a set of logical resource elements, a set of physical resource elements, and a set of access requests elements that respectively model logical resources, physical resources, and access requests received at an access request manager of an enterprise. The physical resource elements may be respectively associated with the logical resource elements such that access rights for the physical resources may be obtained based on a logical resource specified in the access request. A system for managing IAM may include a mapping module configured to transform heterogeneous IAM data provided by a plurality of IAM data sources into homogeneous IAM data formatted according to the common IAM data format. A data store may implement the IAM data model such that the data store is configured to store the homogeneous IAM data.

12 Claims, 33 Drawing Sheets

(56) References Cited

U.S. PATENT DOCUMENTS

| | | |
|---|---|---|
| 5,889,953 A | 3/1999 | Thebaut et al. |
| 5,987,611 A | 11/1999 | Freund |
| 6,321,334 B1 | 11/2001 | Jerger et al. |
| 6,400,726 B1 | 6/2002 | Piret et al. |
| 6,434,559 B1 | 8/2002 | Lundberg et al. |
| 6,460,141 B1 | 10/2002 | Olden |
| 6,711,687 B1 | 3/2004 | Sekiguchi |
| 6,738,973 B1 | 5/2004 | Rekimoto |
| 6,748,447 B1 | 6/2004 | Basani et al. |
| 6,782,350 B1 | 8/2004 | Burnley et al. |
| 6,947,989 B2 | 9/2005 | Gullotta et al. |
| 6,968,385 B1 | 11/2005 | Gilbert |
| 6,983,278 B1 | 1/2006 | Yu et al. |
| 7,075,895 B1 | 7/2006 | Hanam |
| 7,260,689 B1 | 8/2007 | Xu et al. |
| 7,614,082 B2 | 11/2009 | Adams et al. |
| 7,630,974 B2 | 12/2009 | Remahl et al. |
| 7,657,453 B2 | 2/2010 | Guldner et al. |
| 7,739,245 B1 | 6/2010 | Agarwal et al. |
| 7,831,642 B1 | 11/2010 | Kumaresan et al. |
| 7,895,638 B2 | 2/2011 | Becker et al. |
| 7,996,368 B1 | 8/2011 | Nalder et al. |
| 8,051,298 B1 | 11/2011 | Burr et al. |
| 8,082,335 B2 | 12/2011 | Mishra et al. |
| 8,086,635 B1 | 12/2011 | Rinker |
| 8,121,913 B2 | 2/2012 | Bracken et al. |
| 8,135,633 B1 | 3/2012 | LeBaron et al. |
| 8,160,904 B1 | 4/2012 | Smith |
| 8,181,016 B1 | 5/2012 | Borgia et al. |
| 8,204,907 B1 | 6/2012 | Smith |
| 8,306,854 B1 | 11/2012 | Bray et al. |
| 8,386,711 B2 | 2/2013 | Miyamoto et al. |
| 8,438,611 B2 | 5/2013 | Faitelson et al. |
| 8,539,556 B1 | 9/2013 | Brandwine |
| 8,555,403 B1* | 10/2013 | Kilday .................... G06F 21/62 |
| | | 709/229 |
| 8,613,051 B2 | 12/2013 | Nguyen |
| 8,639,622 B1* | 1/2014 | Moore et al. .................... 705/43 |
| 8,639,625 B1 | 1/2014 | Ginter et al. |
| 8,661,534 B2 | 2/2014 | Chatterjee et al. |
| 8,688,813 B2 | 4/2014 | Maes |
| 8,745,711 B2 | 6/2014 | Matsuda |
| 8,775,593 B2 | 7/2014 | O'Sullivan et al. |
| 8,819,492 B2 | 8/2014 | Dande et al. |
| 8,832,410 B2 | 9/2014 | Springberg |
| 8,925,028 B2 | 12/2014 | Talbert et al. |
| 8,964,990 B1 | 2/2015 | Baer et al. |
| 9,244,818 B1 | 1/2016 | Paleja |
| 9,246,945 B2 | 1/2016 | Chari et al. |
| 9,330,134 B2 | 5/2016 | Long et al. |
| 2002/0013855 A1 | 1/2002 | Ishii et al. |
| 2002/0095322 A1 | 7/2002 | Zarefoss |
| 2002/0099825 A1 | 7/2002 | Fertell et al. |
| 2002/0147801 A1 | 10/2002 | Gullotta et al. |
| 2002/0156816 A1 | 10/2002 | Kantrowitz et al. |
| 2002/0156904 A1 | 10/2002 | Gullotta et al. |
| 2002/0169876 A1 | 11/2002 | Curie et al. |
| 2003/0005333 A1 | 1/2003 | Noguchi et al. |
| 2003/0061404 A1 | 3/2003 | Atwal et al. |
| 2003/0083846 A1 | 5/2003 | Curtin et al. |
| 2003/0221012 A1* | 11/2003 | Herrmann ............. G06F 9/5011 |
| | | 709/229 |
| 2004/0010463 A1 | 1/2004 | Hahn-Carlson et al. |
| 2004/0034582 A1 | 2/2004 | Gilliam et al. |
| 2004/0158455 A1 | 8/2004 | Spivack et al. |
| 2004/0160304 A1 | 8/2004 | Mosgrove et al. |
| 2004/0181771 A1 | 9/2004 | Anonsen et al. |
| 2004/0186798 A1 | 9/2004 | Blitch et al. |
| 2004/0210580 A1 | 10/2004 | Butler et al. |
| 2004/0267552 A1 | 12/2004 | Gilliam et al. |
| 2005/0021360 A1 | 1/2005 | Miller et al. |
| 2005/0027948 A1 | 2/2005 | Marlan et al. |
| 2005/0097353 A1 | 5/2005 | Patrick et al. |
| 2005/0114226 A1 | 5/2005 | Tripp et al. |
| 2005/0143231 A1 | 6/2005 | Turnbull et al. |
| 2005/0160411 A1 | 7/2005 | Sangal et al. |
| 2005/0187852 A1 | 8/2005 | Hwang |
| 2005/0227694 A1 | 10/2005 | Hayashi |
| 2005/0262188 A1* | 11/2005 | Mamou .................. G06Q 10/10 |
| | | 709/203 |
| 2005/0288978 A1 | 12/2005 | Furland et al. |
| 2006/0005256 A1 | 1/2006 | Cox |
| 2006/0015450 A1* | 1/2006 | Guck et al. ..................... 705/39 |
| 2006/0031679 A1 | 2/2006 | Soltis et al. |
| 2006/0098790 A1 | 5/2006 | Mendonca et al. |
| 2006/0136582 A1 | 6/2006 | Mills |
| 2006/0137019 A1 | 6/2006 | Dettinger et al. |
| 2006/0143685 A1 | 6/2006 | Vasishth et al. |
| 2006/0155738 A1 | 7/2006 | Baldwin et al. |
| 2006/0161307 A1 | 7/2006 | Patel et al. |
| 2006/0178898 A1 | 8/2006 | Habibi |
| 2006/0190985 A1 | 8/2006 | Vasishth et al. |
| 2006/0293029 A1 | 12/2006 | Jha et al. |
| 2007/0005601 A1 | 1/2007 | Gaucas |
| 2007/0006284 A1 | 1/2007 | Adams et al. |
| 2007/0022315 A1 | 1/2007 | Comegys |
| 2007/0053381 A1 | 3/2007 | Chacko et al. |
| 2007/0129960 A1 | 6/2007 | Farrell |
| 2007/0156912 A1 | 7/2007 | Crawford |
| 2007/0185814 A1 | 8/2007 | Boccon-Gibod et al. |
| 2007/0214497 A1 | 9/2007 | Montgomery et al. |
| 2007/0233531 A1 | 10/2007 | McMahon |
| 2007/0233600 A1 | 10/2007 | McMahon |
| 2007/0245013 A1 | 10/2007 | Saraswathy et al. |
| 2008/0005321 A1 | 1/2008 | Ma et al. |
| 2008/0040810 A1 | 2/2008 | Kurokawa |
| 2008/0052102 A1* | 2/2008 | Taneja ................ G06Q 10/063 |
| | | 705/7.11 |
| 2008/0060058 A1 | 3/2008 | Shea et al. |
| 2008/0098484 A1 | 4/2008 | Cicchitto et al. |
| 2008/0098485 A1 | 4/2008 | Chiou |
| 2008/0120302 A1 | 5/2008 | Thompson et al. |
| 2008/0133907 A1 | 6/2008 | Parkinson |
| 2008/0148253 A1 | 6/2008 | Badwe et al. |
| 2008/0215509 A1 | 9/2008 | Charlton |
| 2008/0244602 A1 | 10/2008 | Bennington et al. |
| 2008/0244605 A1 | 10/2008 | Bennington et al. |
| 2008/0256568 A1 | 10/2008 | Rowland |
| 2008/0288330 A1 | 11/2008 | Hildebrand et al. |
| 2008/0306985 A1 | 12/2008 | Murray et al. |
| 2008/0313703 A1 | 12/2008 | Flaks et al. |
| 2008/0320603 A1 | 12/2008 | Ito |
| 2009/0063691 A1 | 3/2009 | Kalofonos et al. |
| 2009/0089291 A1 | 4/2009 | Daily et al. |
| 2009/0132813 A1 | 5/2009 | Schibuk |
| 2009/0138960 A1 | 5/2009 | Felty et al. |
| 2009/0172674 A1 | 7/2009 | Bobak et al. |
| 2009/0287529 A1* | 11/2009 | Johnson ........................... 705/9 |
| 2009/0307597 A1 | 12/2009 | Bakman |
| 2009/0313079 A1 | 12/2009 | Wahl |
| 2009/0320088 A1 | 12/2009 | Gill et al. |
| 2010/0030777 A1 | 2/2010 | Panwar et al. |
| 2010/0061249 A1 | 3/2010 | Riu et al. |
| 2010/0067390 A1 | 3/2010 | Pereira Valente et al. |
| 2010/0077458 A1 | 3/2010 | Stout et al. |
| 2010/0131526 A1 | 5/2010 | Sun et al. |
| 2010/0145771 A1 | 6/2010 | Fligler et al. |
| 2010/0161634 A1 | 6/2010 | Caceres |
| 2010/0217639 A1 | 8/2010 | Wayne et al. |
| 2010/0228989 A1 | 9/2010 | Neystadt et al. |
| 2010/0250688 A1 | 9/2010 | Sachs et al. |
| 2010/0250730 A1 | 9/2010 | Menzies et al. |
| 2010/0318446 A1 | 12/2010 | Carter |
| 2010/0319051 A1 | 12/2010 | Bafna et al. |
| 2010/0333167 A1 | 12/2010 | Luo et al. |
| 2011/0004085 A1 | 1/2011 | Mensinger et al. |
| 2011/0061111 A1 | 3/2011 | Faitelson et al. |
| 2011/0072018 A1 | 3/2011 | Walls et al. |
| 2011/0078306 A1 | 3/2011 | Krishnamurthy |
| 2011/0107436 A1 | 5/2011 | Cholas et al. |
| 2011/0113493 A1 | 5/2011 | Moore |
| 2011/0128886 A1 | 6/2011 | Husney |
| 2011/0173545 A1 | 7/2011 | Meola |
| 2011/0191213 A1 | 8/2011 | Mora et al. |

(56) References Cited

U.S. PATENT DOCUMENTS

| | | |
|---|---|---|
| 2011/0239044 A1 | 9/2011 | Kumar et al. |
| 2011/0258683 A1 | 10/2011 | Cicchitto |
| 2011/0264278 A1 | 10/2011 | Gilbert et al. |
| 2011/0265150 A1 | 10/2011 | Spooner et al. |
| 2011/0288907 A1 | 11/2011 | Harvey et al. |
| 2011/0302622 A1 | 12/2011 | Bregman et al. |
| 2012/0029969 A1 | 2/2012 | Franke et al. |
| 2012/0030072 A1 | 2/2012 | Boudreau et al. |
| 2012/0030073 A1 | 2/2012 | Boudreau et al. |
| 2012/0079556 A1 | 3/2012 | Wahl |
| 2012/0088540 A1 | 4/2012 | Smith et al. |
| 2012/0095797 A1 | 4/2012 | Nishimura et al. |
| 2012/0098638 A1 | 4/2012 | Crawford |
| 2012/0102489 A1 | 4/2012 | Staiman et al. |
| 2012/0110670 A1 | 5/2012 | Mont et al. |
| 2012/0134550 A1 | 5/2012 | Knoplioch et al. |
| 2012/0151512 A1 | 6/2012 | Talbert et al. |
| 2012/0173728 A1 | 7/2012 | Haskins et al. |
| 2012/0185454 A1 | 7/2012 | Zhang |
| 2012/0216243 A1 | 8/2012 | Gill et al. |
| 2012/0221347 A1 | 8/2012 | Reiner |
| 2012/0233312 A1 | 9/2012 | Ramakumar et al. |
| 2012/0240242 A1 | 9/2012 | Ferenczi et al. |
| 2012/0266073 A1 | 10/2012 | Tanaka et al. |
| 2012/0266228 A1 | 10/2012 | Dash et al. |
| 2012/0278708 A1 | 11/2012 | Jesudasan et al. |
| 2012/0278903 A1 | 11/2012 | Pugh |
| 2012/0297456 A1 | 11/2012 | Rose et al. |
| 2012/0311672 A1 | 12/2012 | Connor et al. |
| 2012/0311684 A1 | 12/2012 | Paulsen et al. |
| 2012/0317565 A1 | 12/2012 | Carrara et al. |
| 2013/0013548 A1 | 1/2013 | Alexander et al. |
| 2013/0030937 A1 | 1/2013 | Larguia et al. |
| 2013/0031070 A1 | 1/2013 | Ducharme et al. |
| 2013/0042294 A1 | 2/2013 | Colvin et al. |
| 2013/0046884 A1 | 2/2013 | Frost et al. |
| 2013/0047247 A1 | 2/2013 | Matsuda |
| 2013/0067093 A1 | 3/2013 | Moreno et al. |
| 2013/0080520 A1 | 3/2013 | Kiukkonen et al. |
| 2013/0097223 A1 | 4/2013 | Mishkevich et al. |
| 2013/0111489 A1 | 5/2013 | Glew et al. |
| 2013/0246901 A1 | 9/2013 | Massand |
| 2013/0316746 A1 | 11/2013 | Miller et al. |
| 2013/0326580 A1 | 12/2013 | Barclay et al. |
| 2013/0333021 A1 | 12/2013 | Sellers et al. |
| 2014/0089511 A1 | 3/2014 | McLean |
| 2014/0101061 A1 | 4/2014 | Boudreau et al. |
| 2014/0108251 A1 | 4/2014 | Anderson et al. |
| 2014/0108404 A1 | 4/2014 | Chen et al. |
| 2014/0129511 A1 | 5/2014 | Bramel et al. |
| 2014/0143831 A1 | 5/2014 | Fieweger |
| 2014/0164544 A1 | 6/2014 | Gagneraud |
| 2014/0173035 A1 | 6/2014 | Kan et al. |
| 2014/0181913 A1 | 6/2014 | Kling et al. |
| 2014/0181914 A1 | 6/2014 | Kling et al. |
| 2014/0181965 A1 | 6/2014 | Kling et al. |
| 2014/0196115 A1 | 7/2014 | Pelykh |
| 2014/0207813 A1 | 7/2014 | Long et al. |
| 2014/0208399 A1 | 7/2014 | Ponzio, Jr. |
| 2014/0237498 A1 | 8/2014 | Ivins |
| 2014/0244569 A1 | 8/2014 | Seto |
| 2014/0280977 A1 | 9/2014 | Martinez et al. |
| 2014/0282825 A1 | 9/2014 | Bitran et al. |
| 2014/0282880 A1 | 9/2014 | Herter et al. |
| 2014/0282922 A1 | 9/2014 | Iwanski et al. |
| 2014/0289402 A1 | 9/2014 | Moloian et al. |
| 2014/0289796 A1 | 9/2014 | Moloian et al. |
| 2014/0298423 A1 | 10/2014 | Moloian et al. |
| 2014/0331277 A1 | 11/2014 | Frascadore et al. |
| 2014/0337971 A1 | 11/2014 | Casassa Mont et al. |
| 2014/0359085 A1 | 12/2014 | Chen |
| 2014/0359695 A1 | 12/2014 | Chari et al. |
| 2014/0365353 A1 | 12/2014 | Shvarts |
| 2014/0379593 A1 | 12/2014 | Koehler et al. |
| 2014/0380058 A1 | 12/2014 | Agarwal et al. |
| 2015/0026823 A1 | 1/2015 | Ramesh et al. |
| 2015/0066572 A1 | 3/2015 | McLaren et al. |
| 2015/0082432 A1 | 3/2015 | Eaton et al. |
| 2015/0120520 A1 | 4/2015 | Prokopenko et al. |
| 2015/0154418 A1 | 6/2015 | Redberg |
| 2015/0163068 A1 | 6/2015 | Cudak et al. |
| 2015/0249852 A1 | 9/2015 | Tang et al. |
| 2015/0249864 A1 | 9/2015 | Tang et al. |
| 2015/0281239 A1 | 10/2015 | Brophy |
| 2015/0319760 A1 | 11/2015 | Wright et al. |
| 2015/0372890 A1 | 12/2015 | Fan et al. |
| 2016/0314578 A1 | 10/2016 | Banerjee et al. |
| 2017/0060930 A1 | 3/2017 | Elkherj et al. |

OTHER PUBLICATIONS

Verifying Separation-of-Duties at IAM System Implementing IAM Data Model, U.S. Appl. No. 13/945,669, filed Jul. 18, 2013.
Access Reviews at IAM System Implementing IAM Data Model, U.S. Appl. No. 13/945,656, filed Jul. 18, 2013.
Reconciling Access Rights at IAM System Implementing IAM Data Model, U.S. Appl. No. 13/945,679, filed Jul. 18, 2013.
Facilitating Review of Access Rights in a Computing System, U.S. Appl. No. 14/267,571, filed May 1, 2014.
Reconciliation of Access Rights in a Computing System, U.S. Appl. No. 14/267,578, filed May 1, 2014.
Computing Resource Inventory System, U.S. Appl. No. 14/267,586, filed May 1, 2014.
Facilitating Separation-of-Duties when Provisioning Access Rights in a Computing System, U.S. Appl. No. 14/267,584, filed May 1, 2014.
Granular Risk Expression, U.S. Appl. No. 14/267,590, filed May 1, 2014.
Quality Assurance Checks of Access Rights in a Computing System, U.S. Appl. No. 14/267,564, filed May 1, 2014.
Easter, C., "Method to Report Access Control of LAN Server Resources on a Per User Basis," IBM Technical Disclosure Bulletin, Apr. 1992, 1 page.
An Oracle White Paper, "Integrated Identity Governance," a Business Overview, 17 pages, Jul. 2012.

* cited by examiner

COMMON DATA MODEL FOR IDENTITY ACCESS MANAGEMENT DATA

CROSS-REFERENCE TO RELATED APPLICATION

This application claims priority to Provisional Patent App. No. 61/740,205 filed on Dec. 20, 2012 and entitled "COMMON DATA MODEL FOR IDENTITY ACCESS MANAGEMENT DATA," which is incorporated in its entirety in the present disclosure.

TECHNICAL FIELD

Aspects of the disclosure provided generally relate to identity and access management and in particular relates to management of identity and access management data using a common data model.

BACKGROUND

Identity and access management (IAM) refers to the processes, technologies, and policies for managing digital identities and controlling how identities can be used to access resources. Resources may refer to computer systems including the hardware and software components that make up the computer systems or a network of computer systems. For example, resources may include information systems, applications, services, programs, computing devices (e.g. servers, PCs), network devices (e.g. switches and routers, networks, files, file systems, databases and database objects (e.g. tables, views, and stored procedures), and the like.

Organizations may utilize various IAM products and services to implement IAM processes, which include authentication, access, and auditing. Authentication refers to verifying identities based on one or more credentials in order to gain access to a resource; access refers to managing login accounts, providing access rights to resources, and authorizing the use of resources; and auditing refers to validating and testing authentication and access capabilities.

IAM products and services may maintain event logs that include information about events that occurred during the authentication, access, and auditing processes. Event information may include, for example, the date and time of the event, the resource at which the event occurred, and other information that identifies and categorizes the event. In this regard, the event log data generated by IAM technologies and services may be referred to as IAM data.

Organizations are increasingly interested in performing large scale data analysis on the IAM data generated by IAM products and services. Analysis of IAM data can be useful, for example, to demonstrate compliance with regulatory requirements. Analysis of IAM data can also be useful to preemptively identify threats to the resources of the organization, e.g., from malware operating with the computing systems of the organization. More generally, analysis of IAM data may enable an organization to improve the efficiency and effectiveness of its IAM policies and procedures.

IAM products and services, however, may generate and store IAM data in unique or proprietary formats. IAM data stored in unique or proprietary formats may not be compatible with the formats required by various data analysis tools. To utilize the analytical tools to perform data analysis on the IAM data, a point-to-point mapping between the unique IAM data format and the format required by the data analysis tool may be necessary. Accordingly, organizations may not be able to integrate uniquely formatted IAM data for large scale data analysis of the integrated IAM data at a data analysis tool.

Therefore a need exists for a common data model for IAM data in the IAM domain.

SUMMARY

The following presents a simplified summary in order to provide a basic understanding of some aspects of the disclosure. The summary is not an extensive overview of all aspects of the disclosure. It is neither intended to identify key or critical elements nor to delineate the scope of the claims. The following summary merely presents some concepts of the disclosure in a simplified form as a prelude to the description below.

A system for managing identity and access management (IAM) data is provided. An IAM data model may model at least a portion of an IAM domain space and provide a common IAM data format. A mapping module may be configured to transform heterogeneous IAM data provided by a plurality of IAM data sources into homogeneous IAM data formatted according to the common IAM data format. A data store may implement the IAM data model such that the data store is configured to store the homogeneous IAM data.

A computer-implemented method for managing IAM data is also provided. An IAM data model may be implemented at a data store. The IAM data model may model a portion of the IAM domain space and provide a common IAM data format. Heterogeneous IAM data may be received from a plurality of IAM data sources, and the heterogeneous IAM data may be mapped based on the IAM data in order to obtain homogeneous IAM data formatted according to the common IAM data format. The homogeneous IAM data may be stored at a data store in accordance with the IAM data model.

A data model for managing IAM data implemented at an electronic database is also provided. The IAM data model may include a set of logical resource elements that model logical resources of an enterprise, a set of physical resource elements that model physical resources of the enterprise, and a set of access requests elements that model access requests received at an access request manager of the enterprise. The physical resource elements may be respectively associated with the logical resource elements such that access rights for the physical resources may be obtained based on a logical resource specified in the access request.

The details of these and other embodiments of the disclosure are set forth in the accompanying drawings and description below. Other features and advantages of aspects of the disclosure will be apparent from the description and drawings.

BRIEF DESCRIPTION OF THE DRAWINGS

Aspects of the disclosure are illustrated by way of example and are not limited by the accompanying figures in which like reference numerals indicate similar elements and in which.

DETAILED DESCRIPTION

Aspects of the disclosure related to identity and access management (IAM). Identity and access management may alternatively be referred to as identity management (IdM) as well as access and identity management (AIM). As noted above, a common data model for the identity and access management domain is needed. The common IAM data model described below provides a mapping for IAM elements and the relationships between those IAM elements such that uniquely formatted IAM data originating at different sources may be integrated and subsequently analyzed. The IAM data may include identity data compiled during the authentication process, access data compiled during the access process, and event data for events occurring during other IAM processes.

An IAM data source may be any resource utilized to implement IAM processes, policies, or procedures. Examples of IAM data sources that implement IAM processes, policies, or procedures include, for example, a Resource Access Control Facility, an Active Directory service, and a Security Intelligence and Risk Management (SIRM) platform. Each of these IAM technologies may generate and compile IAM data in a unique or proprietary format.

Because these technologies are each utilized to implement IAM processes, however, the IAM data generated by these technologies are semantically related or semantically equivalent within the IAM domain. The common data model provided maps this semantically related data to a common IAM data format such that IAM data across IAM technologies may be subsequently integrated and analyzed.

Figure 1:
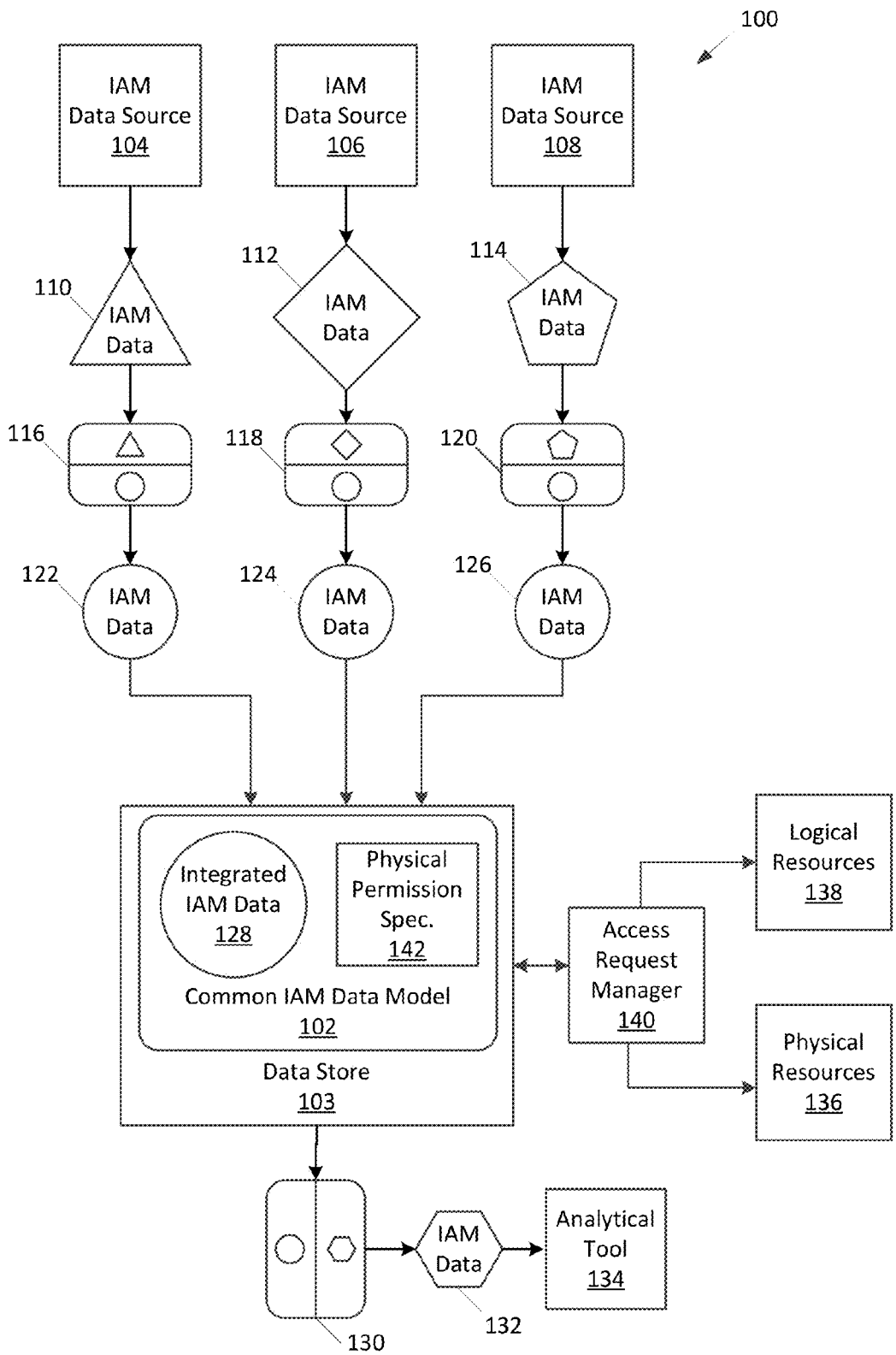
FIG. 1 is an example of an implementation of system for managing identity and access management (IAM) data.

Referring to FIG. 1, an example of an IAM data processing system 100 that includes a common IAM data model 102 is shown. The IAM data model 102 may be implemented at a data storage device 103, e.g. at a database as a set of database tables with corresponding fields and relationships.

Multiple IAM data sources 104, 106, 108 may generate uniquely formatted IAM data 110, 112, 114 during an IAM process. Data mapping modules 116, 118, 120 may be configured to transform the uniquely formatted IAM data 110, 112, 114 into commonly formatted IAM data 122, 124, 126 that conforms to the common IAM data model 102. As seen in FIG. 1, each data mapping module 116, 118, 120 may be respectively configured to map IAM data from a particular IAM data source 104, 106, 108 in order to obtain the commonly formatted IAM data 122, 124, 126.

As shown by way of example, data mapping module 116 may be configured to transform uniquely formatted IAM data 110 into commonly formatted IAM data 122; data mapping module 118 may be configured to transform uniquely formatted data 112 into commonly formatted IAM data 124; and data mapping module 120 may be configured to transform uniquely formatted IAM data 114 into commonly formatted IAM data 126.

Having transformed the uniquely formatted IAM data 112, 114, 116 into commonly formatted IAM data 122, 124, 126, the data store 103 may store the commonly formatted IAM data. The IAM data processing system 100 may integrate the commonly formatted IAM data stored at the data store 103 to obtain integrated IAM data 128. Analytical tools may thus perform data analysis on the integrated IAM data 128 collectively rather than on the uniquely formatted IAM data 110, 112, 114 individually. In this way, the analytical tools may perform large scale data analysis on IAM data originating from multiple IAM data sources.

The IAM data processing system 100 thus avoids having to convert the uniquely formatted IAM data 110, 112, 114 from each IAM data source 104, 106, 108 in a point-to-point fashion. Instead, a single data mapping module 130 may transform the integrated IAM data 128 into IAM data 132 having a format required by an analytical tool 134. Various analytical tools may be selectively employed to analyze the integrated IAM data 128, e.g., using business analytics and business intelligence software.

The system 100 may also be employed to manage access to physical resources 136 and logical resources 138 of an enterprise (e.g., a corporation). Accordingly, the system may also include an access request manager 140 for receiving and processing access requests. The IAM data model 102 may model and create associations between the logical resources 138 and the physical resources 136. The access request manager 140 may initiate provisioning of access rights to logical resources 138 and physical resources 136 in response to receipt of an access request. Further, the access request manager may provision access rights and entitlements based on a physical permission specification 142. Access requests will be discussed in further detail below.

Figure 2:
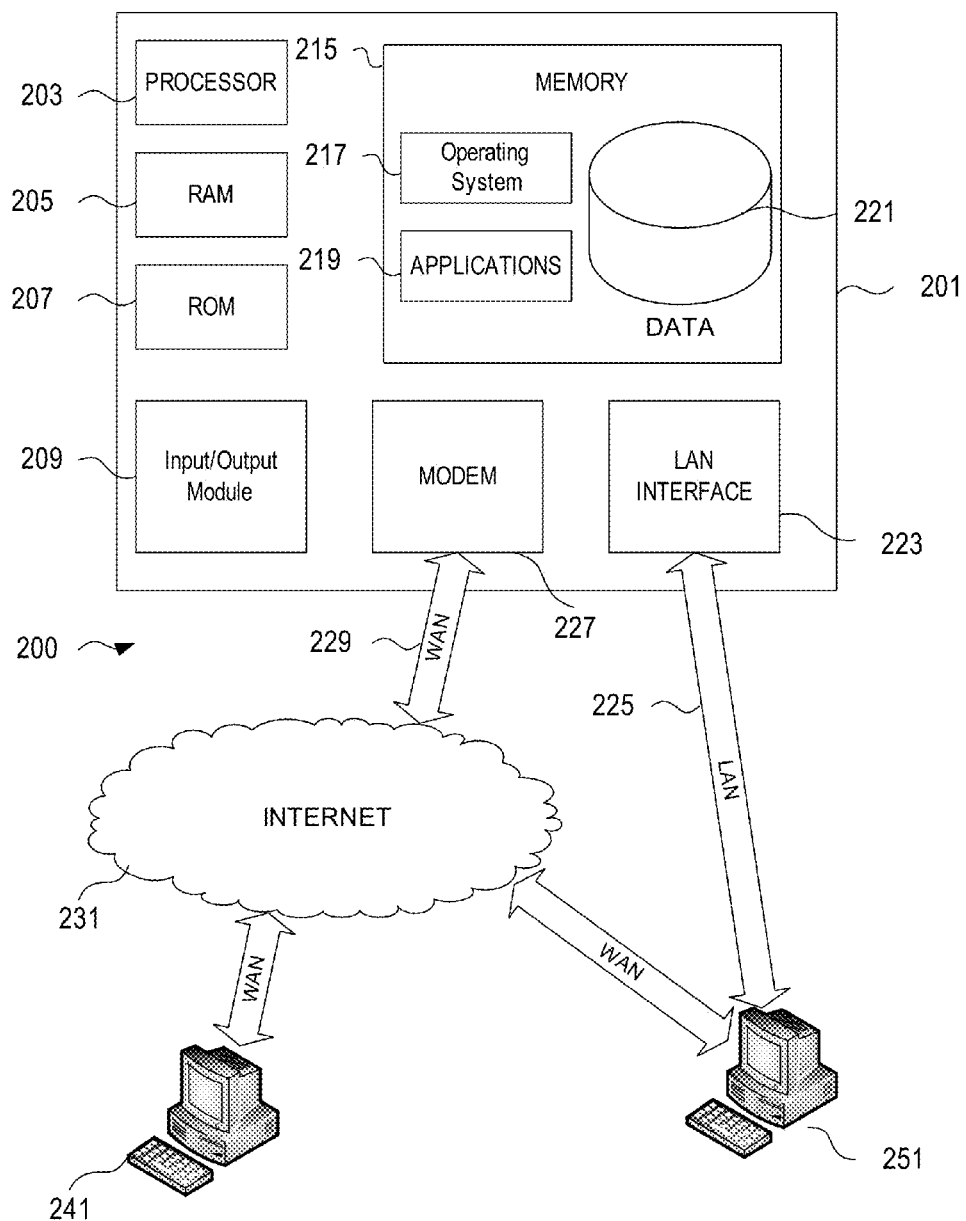
FIG. 2 is a block diagram of a system that may be used according to one or more example embodiments of the disclosure.

FIG. 2 illustrates a block diagram of an IAM data processing module/device 201 (e.g., a computer server) in an IAM data processing system 200 that may be used according to an illustrative embodiment of the disclosure. The device 201 may have a processor 203 for controlling overall operation of the IAM data processing module 201 and its associated components, including RAM 205, ROM 207, input/output (I/O) module 209, and memory 215.

I/O 209 may include a microphone, keypad, touch screen, and/or stylus through which a user of the enhanced backup and retention management module 201 may provide input, and may also include one or more of a speaker for providing audio output and a video display device for providing textual, audiovisual and/or graphical output. Software may be stored within memory 215 and/or storage to provide instructions to processor 203 for enabling device 201 to perform various functions. For example, memory 215 may store software used by the device 201, such as an operating system 217, application programs 219, and an associated database 221. Processor 203 and its associated components may allow the device 201 to run a series of computer-readable instructions to process IAM data. For instance, processor 203 may cause module 201 to extract IAM data from an IAM data source and transform the IAM data to the common IAM data format such that the IAM data conforms to the common IAM data model. In addition, processor 203 may retrieve the commonly formatted IAM data from the database 221 and transform the commonly formatted IAM data based on a format required by an analytical tool.

The server 201 may operate in a networked environment supporting connections to one or more remote computers, such as terminals 241 and 251. The terminals 241 and 251 may be personal computers or servers that include many or all of the elements described above relative to the computing device 201. The network connections depicted in FIG. 2 include a local area network (LAN) 225 and a wide area network (WAN) 229, but may also include other networks. When used in a LAN networking environment, the server 201 is connected to the LAN 225 through a network interface or adapter 223. When used in a WAN networking environment, the server 201 may include a modem 227 or other means for establishing communications over the WAN 229, such as the Internet 231. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 219 used by the IAM data processing module 201 according to an illustrative embodiment of the disclosure may include computer executable instructions for invoking functionality related to extracting IAM data from IAM sources and mapping the extracted IAM data to the common IAM data model.

IAM data processing module 201 and/or terminals 241 or 251 may also be mobile terminals, such as smart phones, personal digital assistants (PDAs), and the like, including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like. that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 3:
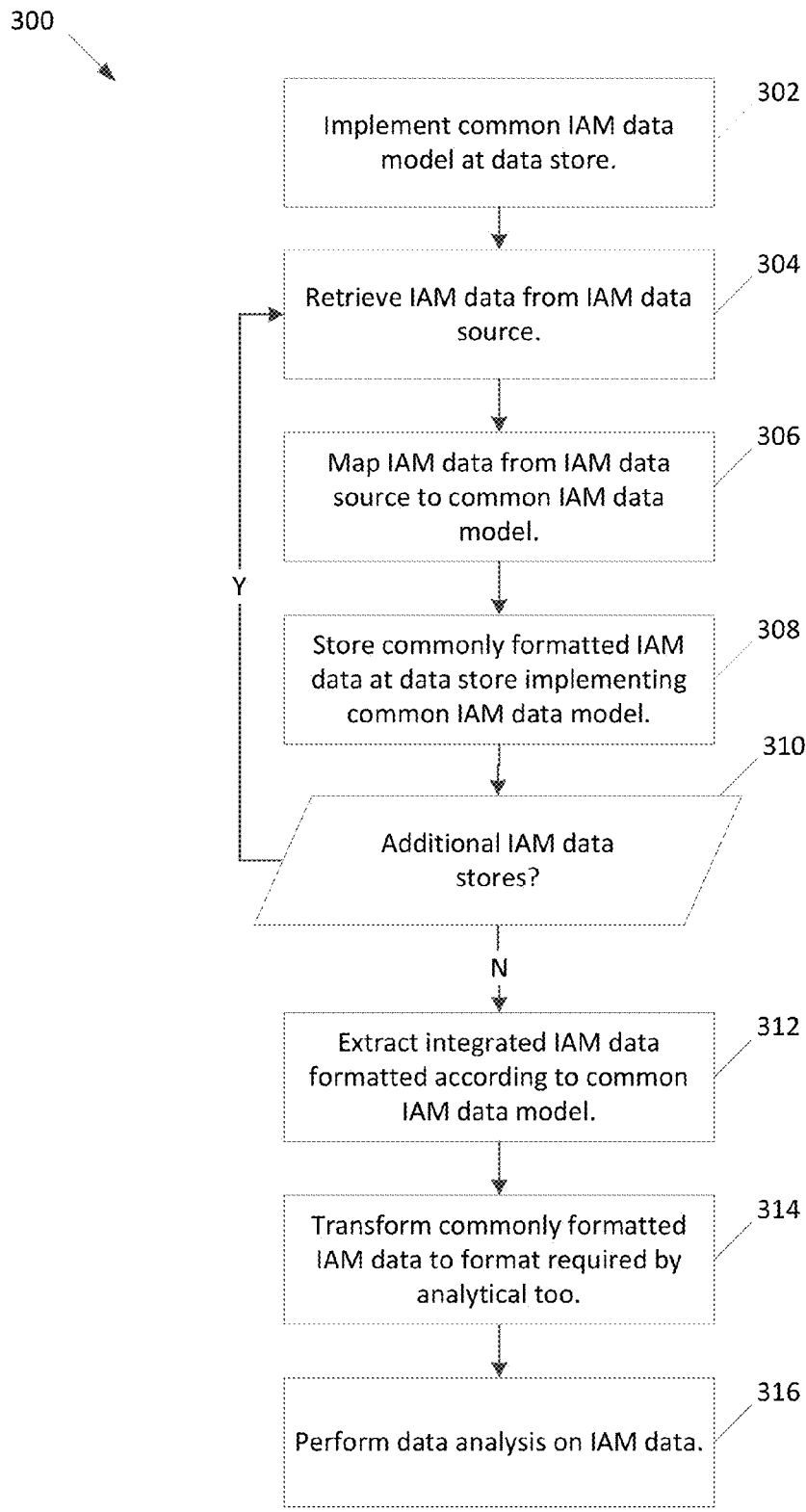
FIG. 3 is a flowchart of example method steps for processing IAM data in accordance with the common IAM data model.

Referring to FIG. 3, a flowchart 300 of example method steps for processing IAM data in accordance with the common IAM data model is shown. The common IAM data model may be implemented at a data store that stores IAM data conforming to the common IAM data model (step 302). The IAM data model may be implemented at a data modeling tool. The data modeling tool may be configured to generate data definition language (DDL) for implementing the common IAM data model at a data store, e.g., a database. The DDL may define the database schema that corresponds to the common IAM data model, and a database management system may use the DDL to create the database tables and columns that correspond to the common IAM data model.

IAM data may be retrieved from an IAM data source (step 304). Various tools may be selectively employed to extract the IAM data from the IAM data sources, e.g., data integration software. A data mapping module may map the uniquely formatted IAM data to the common IAM data model (step 306). Multiple data mapping modules may be employed to respectively map IAM data extracted from multiple IAM data sources. In this way, uniquely formatted IAM data from multiple sources is transformed to a common IAM data format, e.g., the common IAM data format defined by the common IAM data model described in this disclosure.

Having mapped the extracted IAM data to the common IAM data format, the commonly formatted IAM data may be stored in the data store that implements the common IAM data model (step 308). If additional IAM data sources remain (step 310), then steps 304-308 may be repeated to retrieve uniquely formatted IAM data from another IAM data source, map the uniquely formatted IAM data to the common IAM data model, and store the transformed commonly formatted IAM data in the data store that implements the common IAM data model.

The common IAM data model thus permits the combination and integration of IAM data from different IAM data sources. Once the commonly formatted IAM data has been stored in the data storage device, the IAM data is available for subsequent processing as needed, e.g., for large scale data analysis.

To perform data analysis, commonly formatted IAM data may be retrieved from the data storage device (step 312). The commonly formatted IAM data retrieved from the data store may be IAM data integrated from multiple IAM data sources. A data mapping module may transform the commonly formatted IAM data to a format required by an analytical tool (step 314). The analytical tool may thus perform data analysis on the integrated IAM data that originated from multiple IAM data sources as uniquely formatted IAM data (step 316).

Figure 4:
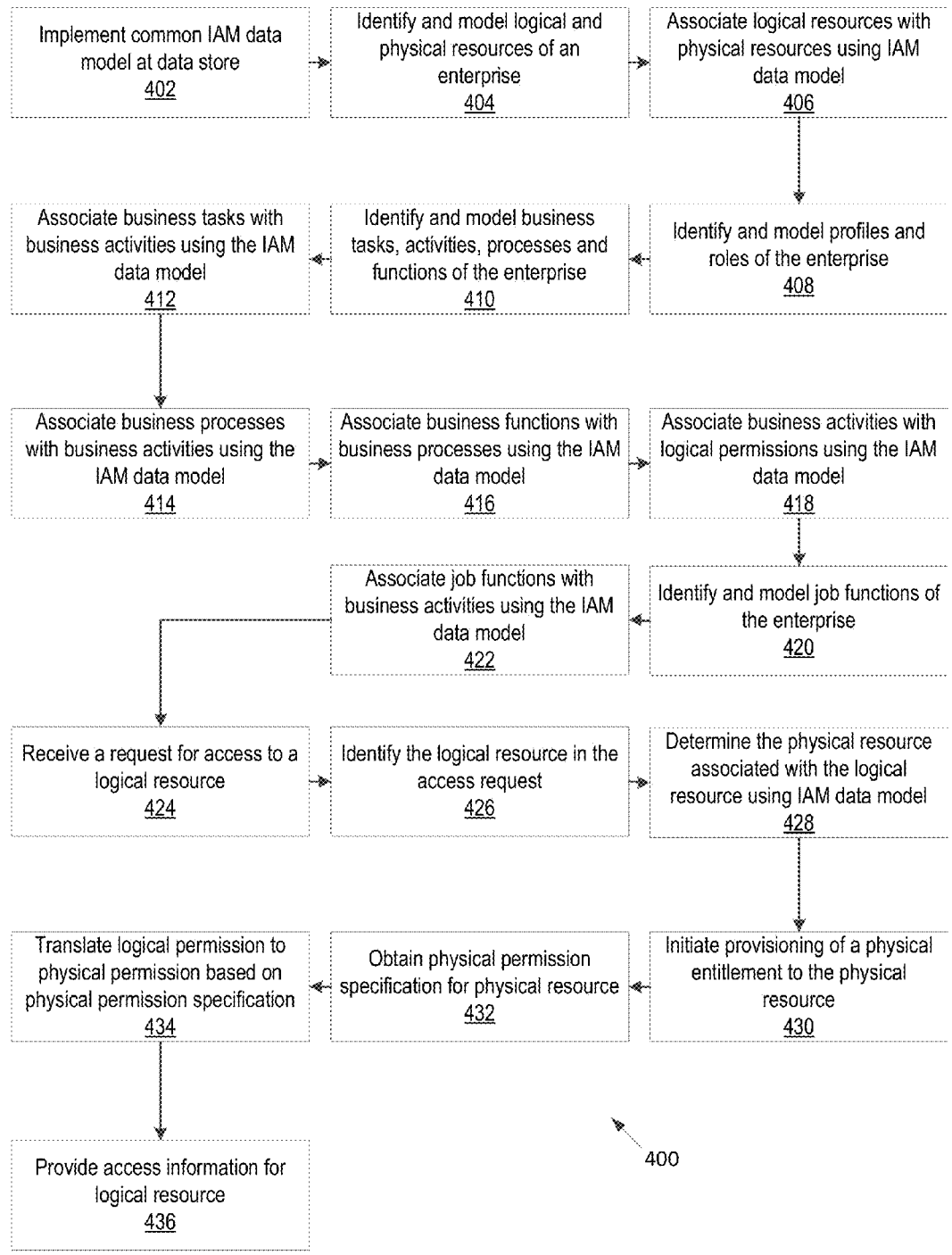
FIG. 4 is a flowchart of example method steps for managing IAM data in accordance with aspects of the disclosure.

An enterprise (e.g., a business) may also utilize the common IAM data model to manage access rights to various resources of the business. FIG. 4 is a flowchart 400 of example method steps for managing IAM data at an enterprise. A common IAM data model may be implemented at a data store, e.g., a database (block 402). The common IAM data model may be, for example, the common IAM data model described in this disclosure. The logical resources and physical resources of an enterprise may be identified (block 404). Logical resources may be associated with corresponding physical resources using the IAM data model implemented at the data store (block 406), e.g., via database records. Logical and physical resources will be discussed in further detail below. Enterprise engineers, business managers, information technology personnel, and other individuals associated with the enterprise may, for example, be responsible for identifying and modeling the logical resources and physical resources at the data store that implements the IAM data model.

Profiles and roles associated with the enterprise may be identified and modeled using the IAM data model implemented at the data store (block 408), e.g., by adding and updating database records corresponding to and associated with the profile and roles. Business tasks, activities, processes, and functions may be identified and also modeled using the IAM data model implemented at the data store (block 410), e.g., database records corresponding to the business tasks, activities, processes, and functions may be created, updated, and related at the database implementing the IAM data model. For example, business tasks may be associated with business activities using the IAM data model implemented at the data store (block 412). Additionally, business processes may be associated with business activities using the IAM data model implemented at the data store (block 414). Further, business functions may be associated with business processes using the IAM data model implemented at the data store (block 416). Moreover, business activities may be associated with logical permissions using the IAM data model implemented at the data store (block 418). Job functions may be identified and modeled using the IAM data model implemented at the data store (block 420), e.g., by adding and updating database records corresponding to and associated with the job functions. Job functions may be associated with business activities using the IAM data model implemented at the data store (block 422). Business managers may, for example, be responsible for identifying and modeling profiles and roles as well as the business tasks, activities, processes, and functions of the enterprise.

Having identified, modeled, and associated resources, job functions, and business tasks, activities, processes, and functions, access to those resources may be provisioned based on a particular job function or business task, activity, process, or function. Accordingly, an access request manager may receive an access request regarding a logical resource (block 424). The access request manager may identify the logical resource indicated in the access request (block 426) and identify one or more physical resources that correspond to the logical resource (block 428). The access request manager may thus initiate provisioning of physical entitlements to the physical resources corresponding to the logical resource (block 430) and obtain physical permissions to those physical resources (block 432). Obtaining the physical permissions may include translating logical permissions into physical permissions based on a physical permission specification associated with the logical resource (block 434). Once the access information has been provisioned, the access request manager may provide the access information for the logical resource to a user (block 436). Access requests will be discussed in further detail below.

In FIGS. 5-26 various diagrams that illustrate portions of an IAM data model are shown. Those skilled in the art will recognize that the IAM data model organizes IAM concepts into attributes, elements, and relationships using what may be referred to as an element-relationship (ER) diagram, also known as an entity-relationship diagram. It will be appreciated, however, that because the IAM domain employs the term "entity" in an IAM context, the ER diagram described in this disclosure will be referred to as an "element-relationship" diagram for the purpose of clarity. When implemented at a database, the elements, attributes, and relationships may equate to tables, columns, and relationships in the database (e.g., a relational database). Furthermore, those skilled in the art will recognize the notations used in the figures as establishing respective relationships between the various elements of the ER diagram including, e.g., inheritance relationships as well as one-to-one (1:1), zero-to-one (0:1), one-to-many (1:M), zero-to-many (0:M), and many-to-many (M:M) relationships. Some of the diagrams include attributes that identify and describe the elements and relationships. One or more attributes may be employed as a primary key (i.e., unique key) to uniquely identify an instance of an element or a relationship (e.g., a row in a database table). Attributes may also be employed as foreign keys to establish the relationships between elements. In the ER diagram for the IAM data model, primary keys and foreign keys are underscored (i.e., underlined).

Figure 5:
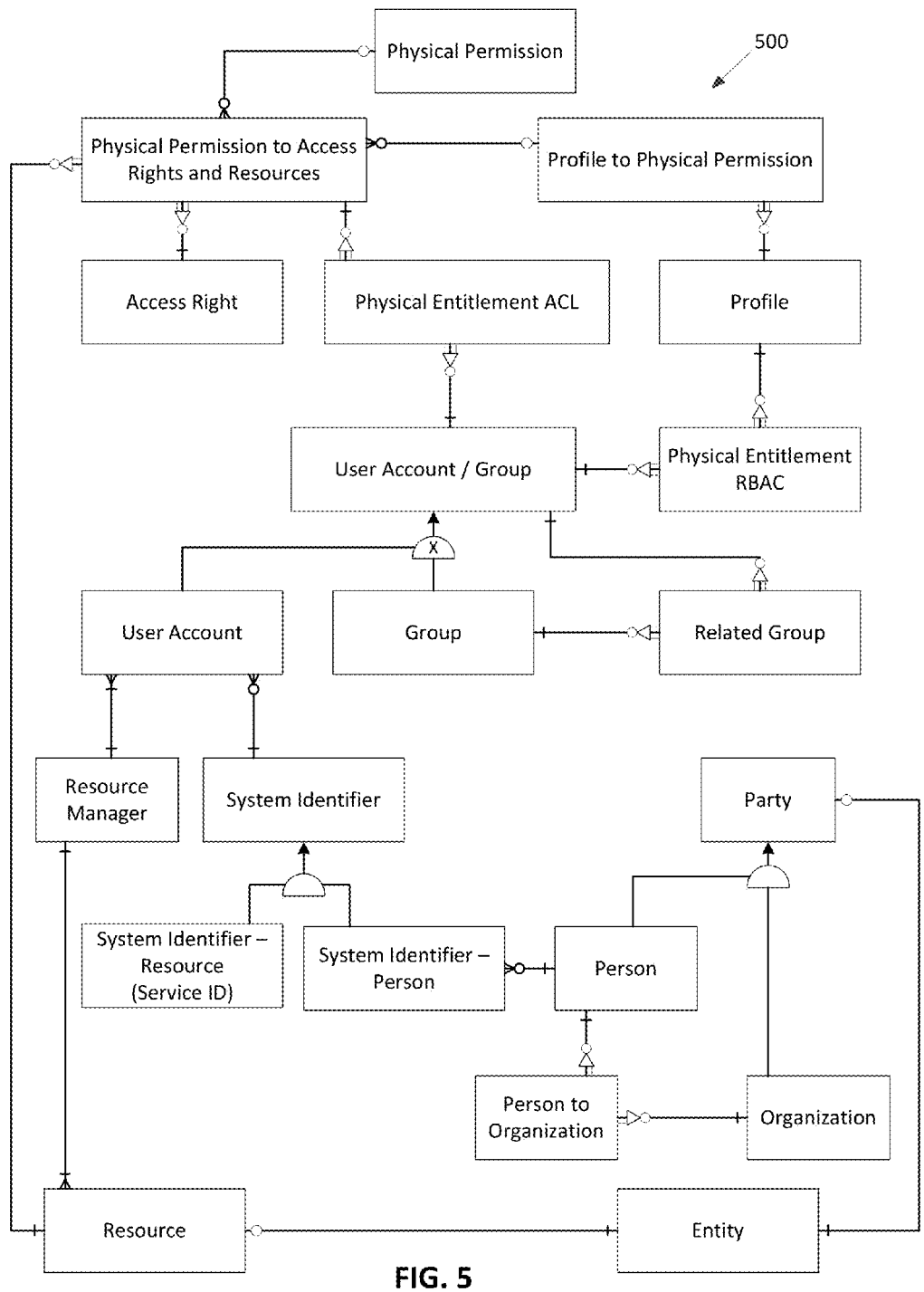
FIG. 5 is a diagram of a portion of an example IAM data model relating to resources, accounts, physical entitlements, profiles, and roles.

Referring now to FIGS. 5-10, summary views of an example of an IAM data model are shown. In FIG. 5, a portion 500 of an example IAM data model relating to resources, accounts, physical entitlements, profiles, and roles is shown. A resource (e.g., a system resource) may be a computer system including any hardware and software components as well as a network of computer systems. Resources may include information systems, applications, services, programs, computing devices (e.g. servers, PCs), network devices (e.g. switches, routers, networks, files, file systems, databases, and database objects such as tables, views, and stored procedures). A resource manager may be an operating system level or an application level function that manages access to one or more resources. Resource managers may include an operating system file manager that manages access to files and file systems, a database management system (DBMS) that manages access to database tables and views and an application using application level security to control access to application programs. A resource manager may manage one or more resources. Accordingly, a resource may be associated with the resource manager that manages the resource. A resource manager may be associated with one or more user accounts.

A user may be anything identified on a system or a network. Users may include, for example, associates and customers that access bank systems. A resource manager may issue user accounts to users in order to manage access to the resources associated with the resource manager. One example of a user account may be a server login account that provides access to a server. The user account, in this example, may or may not provide access to other resources associated with the server such as files stored at the server. A resource manager may assign an access identifier to a user account, e.g., an identifier for a directory service.

Access refers to the ability of a user to perform an action on a resource. Examples of access rights include, for example, create, read, update, delete, and execute. An access right refers to the authority to perform types of access such as reading or writing to a file. Entities may include, for example, individuals, organizations, and even other resources. Individuals and organizations may be collectively referred to as parties (e.g., parties to a contract).

A system identifier refers to an identifier for an individual or for a resource in a computing environment. An identifier for a resource may be referred to as a service ID. An Individual as well as a service ID may be associated with a system identifier that may be related to many user accounts. A user account may allow the associated the individual or service ID to access one or more of the resources controlled by a resource manager. In some implementations, a resource may be controlled by multiple resource managers. When an individual or service ID needs to access resources controlled by multiple resource managers, an individual or service ID may be associated with multiple user accounts. User accounts may include a single sign-on account that manages the login process on behalf of other accounts. A single sign on manager is a type of resource manager.

A group may be a container for multiple user accounts and for other groups. A group may, for example, be associated with both user accounts and other groups. A group may also be assigned an access ID. Identifiers for user and groups may share a common set of access IDs. A group may be composed entirely of other groups or of both user accounts and groups. Groups may be nested for any number of levels. Related groups may contain the groups and user accounts that are members of each group.

A physical permission may be a set of one or more access rights to resources. Physical permissions may include, for example, the authority to execute server transactions; authority to read a file, authority to update a database table, and the like. A physical entitlement with respect to an access control list (ACL) may be a combination of a physical permission and a user account (or group). In this way, entitlements may be associated with user account or a group as well as with groups nested within groups. A physical entitlement may serve as the basis for run-time authorization decisions. A profile may be the named collection of permissions, e.g., physical permissions. Rule profiles may be based on job codes or job categories. A physical entitlement with respect to role based access control (RBAC) may be a set of user accounts (or groups) associated with a profile. A physical entitlement based on RBAC may be a set of one or more user accounts (or groups) associated with a profile.

Figure 6:
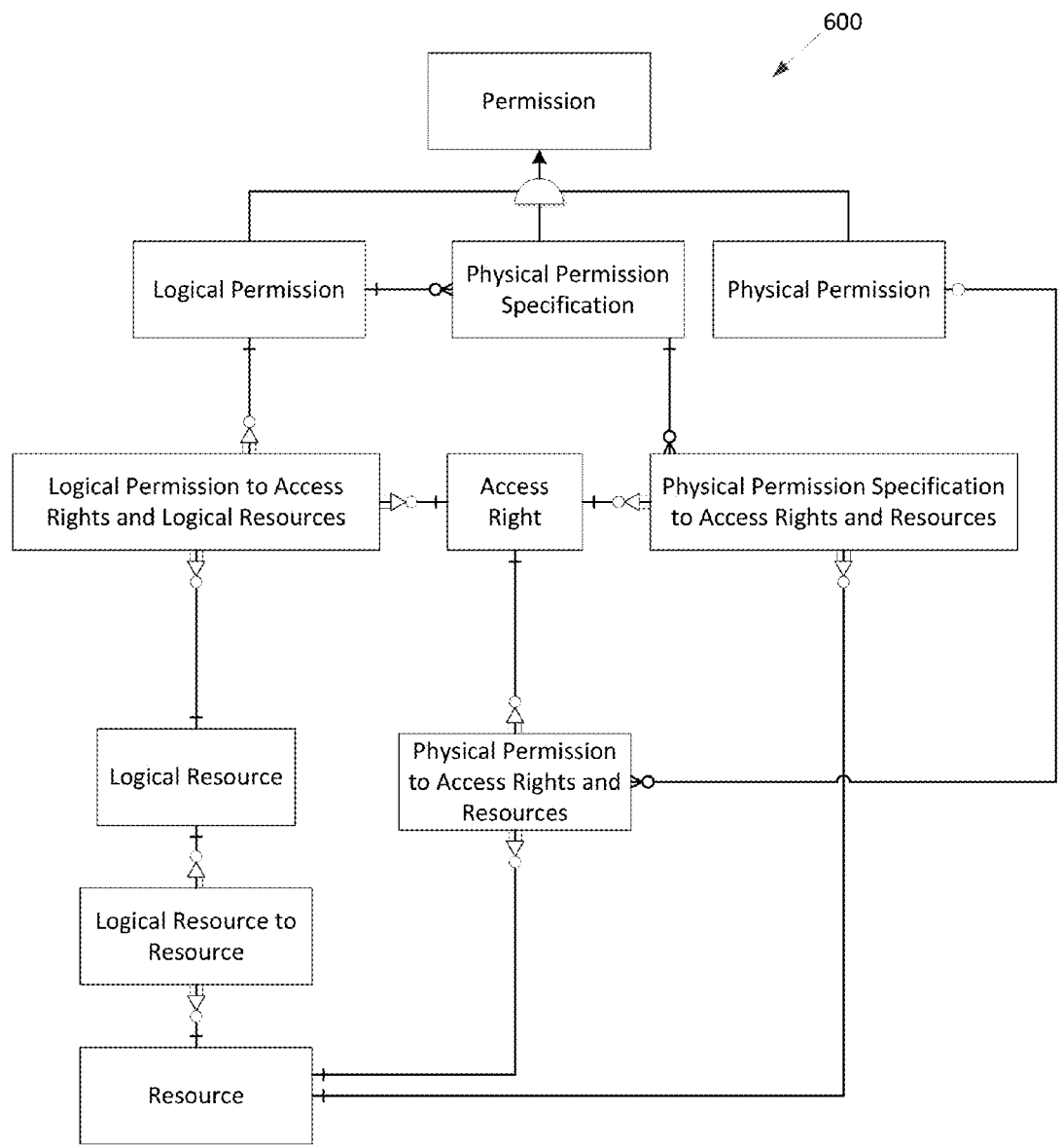
FIG. 6 is a diagram of a portion of an example IAM data model relating to logical resources, logical permissions, and physical permissions.

In FIG. 6, a portion 600 of an example IAM data model relating to logical resources, logical permissions, and physical permissions is shown. A logical resource, in this example, is a type of resource or a resource component that is visible or accessible to an end user. Logical resources may include, for example, end user procedures, job aids, and use cases. Logical resources may, in some cases, be implemented with resources and resource components that are not visible to an end user. One example of a logical resource may be a screen used by an end user to maintain customer accounts. A server transaction that invokes the screen may be a resource associated with the logical resource but may not be visible to the end user. Logical resources may correspond to or be associated with one or more physical resources. In this example, Logical Resource To Resource contains combinations of logical resources and corresponding physical resources. The relationship between logical resources and physical resources, in this example, is modeled as a many-to-many relationship such that a logical resource may be implemented by many physical resources and such that a physical resource can be implement many logical resources.

A permission may be a set of one or more access rights to one or more logical or physical resources. Permissions may include, for example, access rights to use a particular screen (i.e., a logical resource), access rights to execute a particular application, access rights to delete a row in a database table, and the like. A logical permission may be a set of one or more access rights to one or more logical resources. Logical permissions may include, for example, the ability to access and use customer maintenance screens in order to maintain customer accounts. The IAM data model, in this example, establishes the Logical Permission element as a subtype of Permission. The Logical Permission element may identify a particular logical permission. A logical permission may be associated with multiple combinations of access rights to logical resources. The Logical Permission To Access Rights And Logical Resources element, in this example, associates pairings of access rights and logical resource to a particular logical permission. The IAM data model, in this example, also establishes the Physical Permission element as a subtype of Permission. The Physical Permission To Access Rights And Resources element, in this example, relates a physical permission to combinations of access rights and resources that are deployed on target platforms and used for access decisions at run-time.

A logical permission may be translated into a physical permission that can be deployed to a target platform. A physical permission specification may employed to translate a logical permission to zero, one, or multiple physical permissions. One example includes mapping server transaction codes utilized to execute a set of customer maintenance screens that are defined as logical resources. A logical resource may be associated with a corresponding physical permission specification. A physical permission specification may be associated with pairs of access rights and resources. In this way, logical resources may appear to be seamlessly integrated to a user but involve relationships between multiple physical resources on multiple platforms. The IAM data model, in this example, also establishes the Physical Permission Specification element as a subtype of Permission. The Physical Permission Specification To Access Rights And Resources element relates a specification to specific combinations of access rights and resources.

Figure 7:
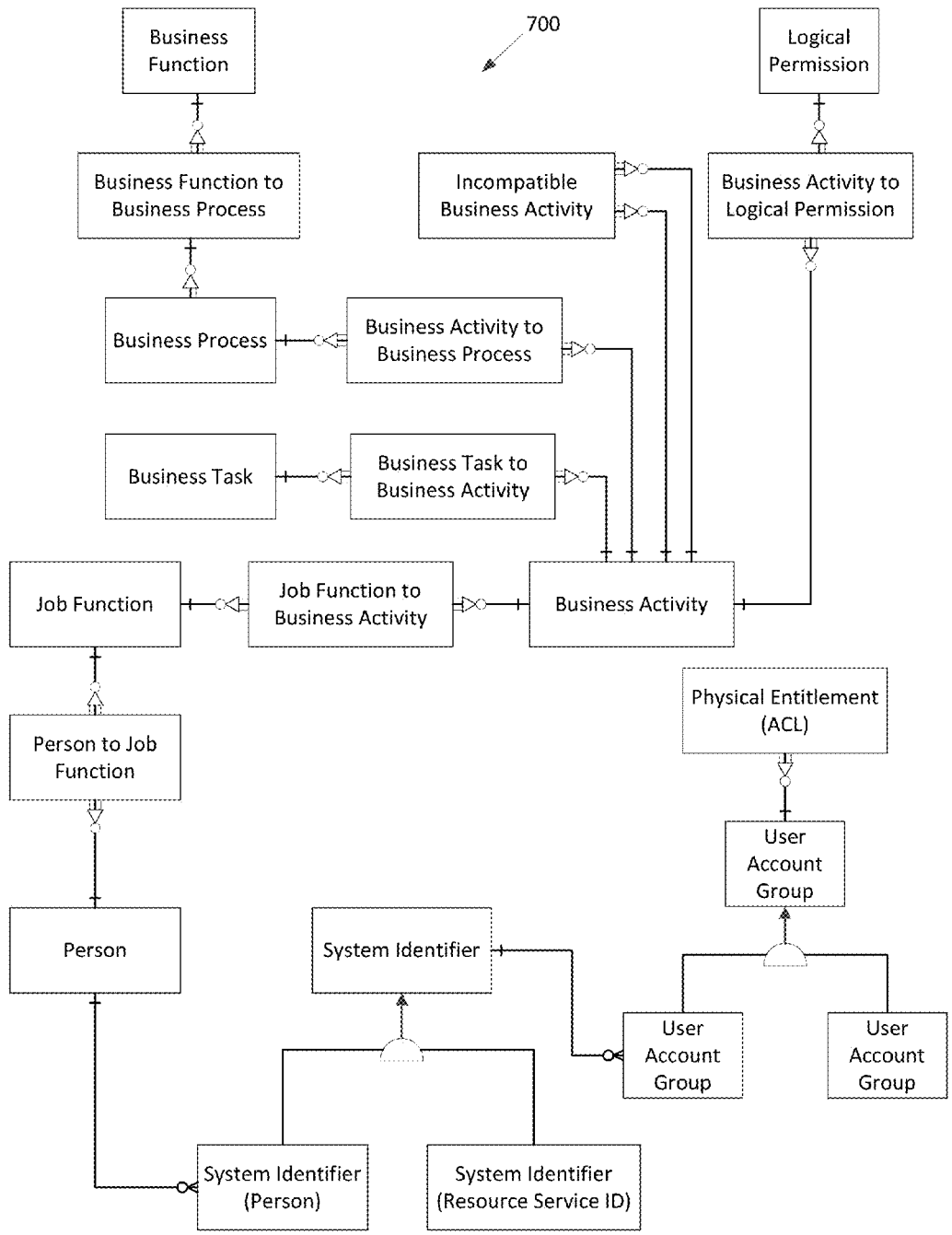
FIG. 7 is a diagram of a portion of an example IAM data model relating to business activities, job functions, and logical permissions.

In FIG. 7, a portion 700 of an example IAM data model relating to business activities, job functions, and logical permissions, is shown. A business task may refer to a discrete unit of work having an associated set of inputs and outputs. One example of a business task includes the review of a loan form submitted by a customer for completeness and to verify customer name and address information on the form. A business activity may refer to a set of business tasks having a specific inputs and outputs for a particular business purpose. One example of a business activity includes loan origination, which may include includes many business tasks such as assisting a customer in preparing a loan form, reviewing the loan form for completeness, verifying customer account information on the form, and verifying any information not in the account records. Because a business task may be a discrete unit of work, a business task may be associated with many business activities and a business activity may be associated with many business tasks. To continue the example above, verifying customer account information may be associated with other business activities beyond loan origination. A business process may refer to a set of one or more steps designed to produce a product or service. Proceeding from loan origination thru close in an example of one business process that may include multiple business activities such as, e.g., loan origination, credit checking, and preparing closing documents. A business process may span multiple business functions. For example, a loan origination office may manage multiple individuals performing a portion of the process.

An individual performing a business activity may need access to one or more logical resources (e.g. screens and reports). The Business Activity To Logical Permission element may associate business activities to logical permissions (i.e. access rights to logical resources). A logical resource may be utilized by multiple business activities (e.g. an account lookup screen), and a business activity may utilize multiple logical resources (e.g. screen to request a credit report and a screen to update the customer records). A physical permission may be related to a group, in this example, via the Physical Entitlement-ACL element. A group of physical entitlements may thus be associated with a business activity, in this example, via the Business Activity To Group element.

A job function may be a collection of related business activities. An individual may be associated with a job function. One example of a job function includes a teller at a bank where the teller may perform multiple business activities such as, e.g., opening and servicing customer accounts, taking deposits, processing loan forms, and the like. Business activities may be associated with different business processes. Other examples of business processes include customer relationship management, check processing from deposit through clearing, loan origination to close. A job function may involve performing activities with within each of these business processes.

Roles may be associated with a set of entitlements, e.g., in role based access control (RBAC). The IAM data model, in this example, may associate roles with a set of entitlements that are, in turn, associated with a set of business activities. Logical permissions may be associated with a set of business activities that are, in turn, associated with a job function. The IAM data model, in this example, associates an individual with a job function, job functions with a business activities, and business activities with logical entitlements. The IAM data model, in this example, also associates an individual with a system identifier and through the system identifier to a user account. A user account may be associated with physical entitlements, which may correspond to the implementation of logical entitlements. The IAM data model, in this example, also models incompatible business activities. Incompatible business activities may be business activities where it is undesirable to have the same individual perform those business activities. For example, it may be undesirable to have an individual responsible for originating loans should to approve loans.

Figure 8:
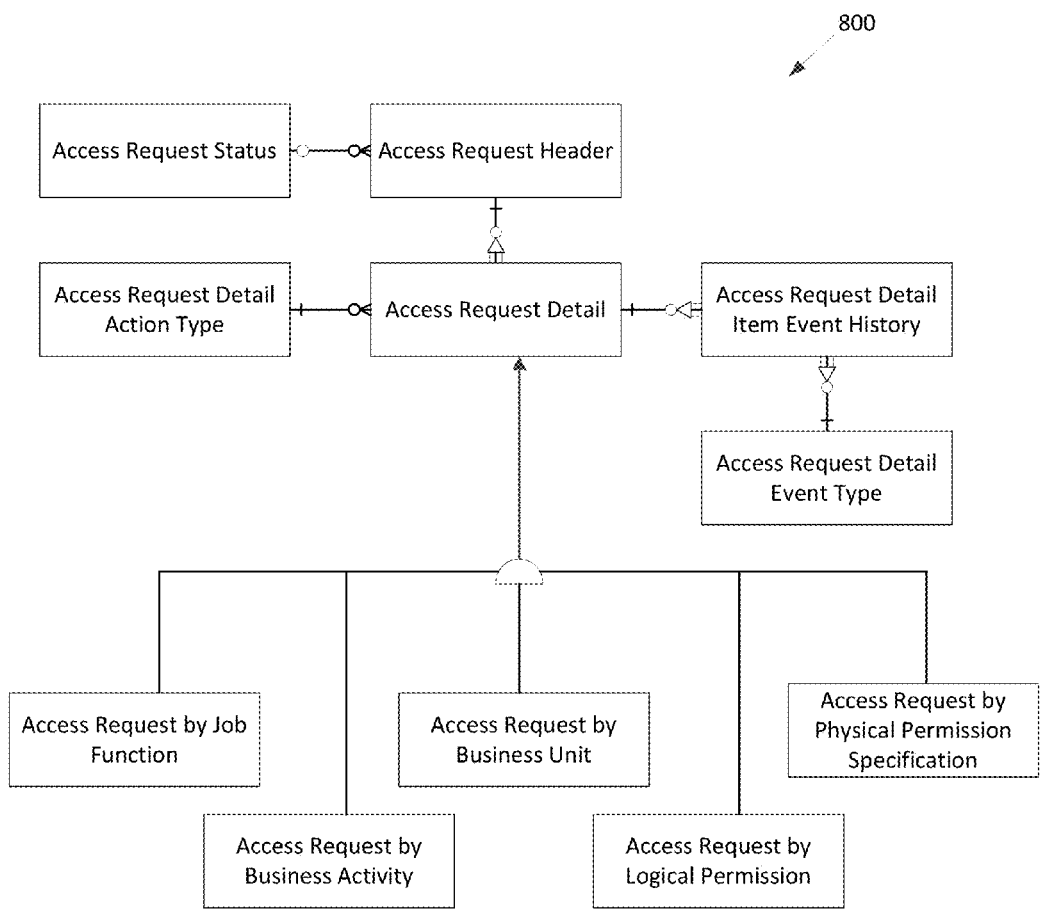
FIG. 8 is a diagram of a portion of an example IAM data model relating to access requests.

FIG. 8, a portion 800 of an example IAM data model relating to access requests is shown. An access request refers to a request to provision an individual with the necessary access rights, entitlements, and permissions to access a logical resource and corresponding physical resources. The IAM data model, in this example, includes an Access Request Header element and an Access Request Detail element to model access requests. The Access Request Header element, in this example, includes an access request status, the user account of the requestor, the user account or group of the requestee, the access request resource.

The Access Request Detail element may permit a single access request to support many different actions on many different types of requests. The IAM data model, in this example, models five types of access requests, although it will be appreciated that additional or alternative types of access requests may be employed. Access request types may include, e.g., an access request by job function, an access request by business activity, an access request by business unit, an access request by logical permission, and an access request by physical permission specification. An access request detail may be associated with an access request detail action. The Access Request Detail Action Type element may contains a set of actions associated with an access request (e.g. add, suspend, and revoke).

Access request details may be associated with one or more events that include approvals and physical completion of items. The Access Request Detail Event Type element may include the domain of valid event types. The Access Request Detail Item Event History element may include the date time history of respective events.

Figure 9:
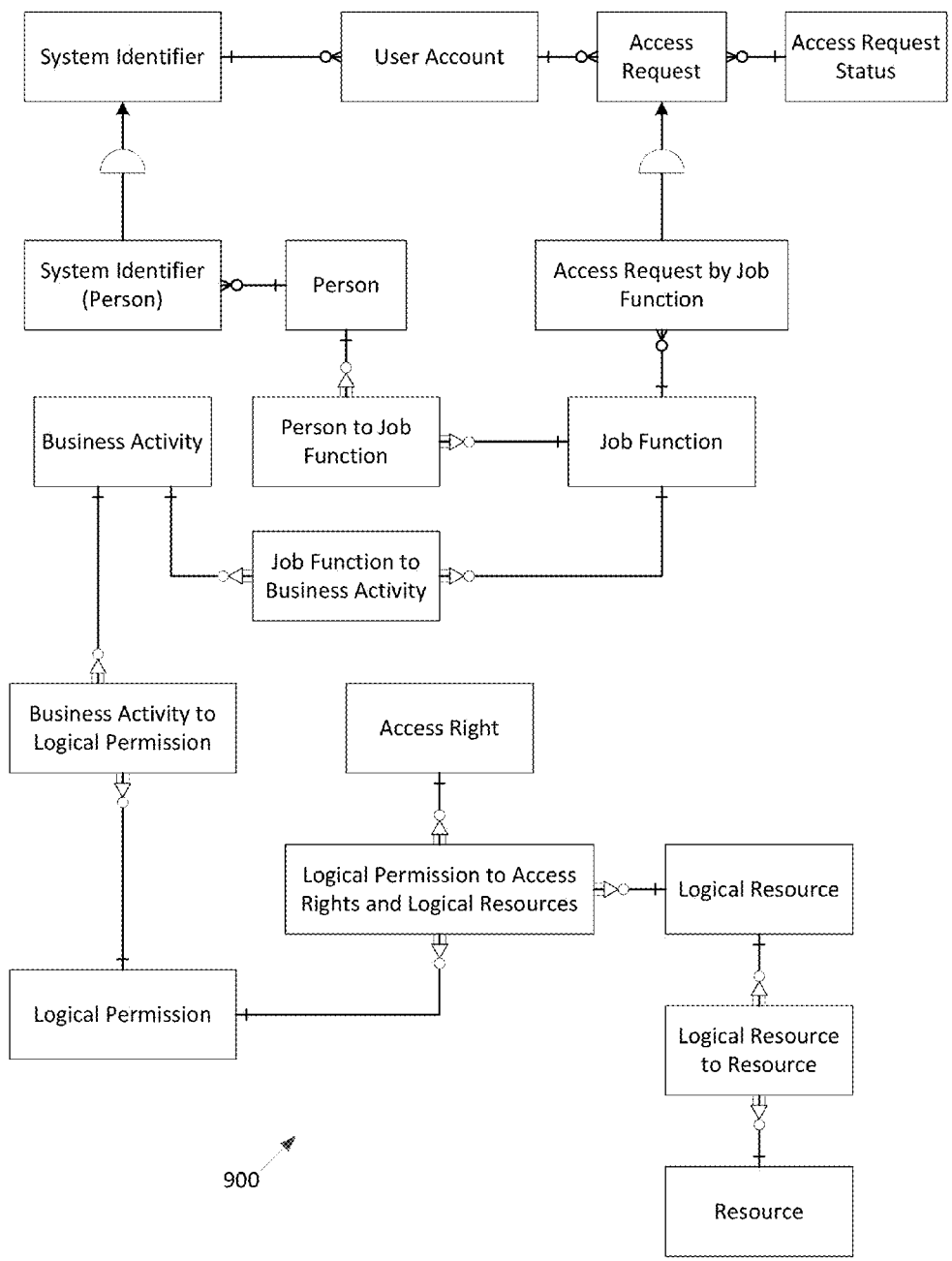
FIG. 9 is a diagram of a portion of an example IAM data model relating to access requests with respect to job functions and logical permissions.

FIG. 9, a portion 900 of an example IAM data model relating to access requests with respect to job functions and logical permissions is shown. The IAM data model permits an alternative approach to RBAC. The IAM data model leverages the business architecture concept that describes the business in terms business process composed of business activities and business tasks. As discussed above, job functions may be a collection of pre-defined business activities and may correspond to roles with respect to RBAC, and logical permissions may be access rights to resources visible to the business. When an individual performs a business activity, the individual may need to access various resources of the business, e.g., particular software applications or services. As noted above such resources may be defined as logical resources, and logical permissions may provide access to those logical resources. Logical permissions may be associated with business activities, and business activities may be associated with job functions. In this way, roles are based on the business architecture and use logical entitlements that have business meaning in the context of the business activities associated with the roles.

Job functions may be a collection of specific business activities. An individual may be assigned multiple job functions, and a job function may be associated with particular business activities. For example, a baseline job function may be set up for basic resources such as an email application and a timekeeping application. A business may assign this baseline job function to a new hire and submit an access request for these basic applications. A manager may submit subsequent access requests for other job functions based on activities performed by the new hire. For example, basic teller job function may include business activities for customer service, deposit process, safe deposit boxes, and the like. A senior teller job function may include business activities beyond the scope of responsibility for a basic teller. In this example, a senior teller may be associated with multiple job functions: the baseline job function for access to basic resources, the basic teller job function for access to resources utilized by basic tellers, and the senior teller for access to resources utilized by senior tellers.

In this way, the IAM data model advantageously streamlines the process of identifying logical resources and what job functions, business activities and the like should have access to those resources. Moreover, the IAM data model permits enterprise from dividing the process providing access into a business side and a physical side. On the business side, entitlements may be requested in business terms, and access reviews may be conducted in business terms. On the physical side, the IAM data model establishes a link between access requests in business language and the specifications to provision physical entitlements. Furthermore, a reconciliation process between the physical entitlement specifications and the entitlements provisioned may ensure that provisioned entitlements can be linked to corresponding access requests. As a result, the business may advantageously operate in business terms without regard to the entitlements ultimately provisioned in physical terms. Additionally, access reviews may be performed in the same language as access requests, that is, in terms of job functions, business activities, and logical permissions. Access requests may be provisioned as physical entitlements, and a reconciliation process may allow access reviews to be performed in business terms without referring to the underlying physical entitlements.

Figure 10:
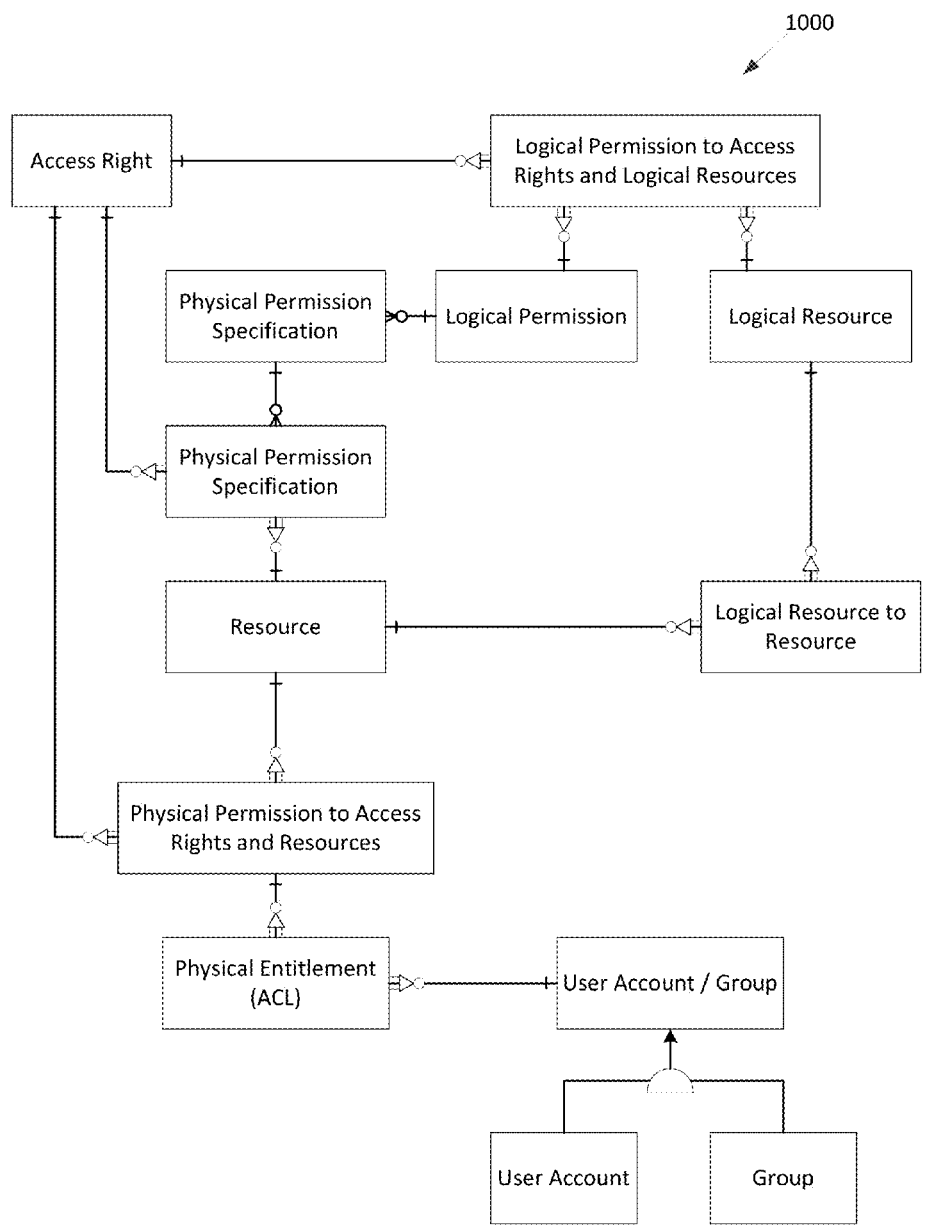
FIG. 10 is a diagram of a portion of an example IAM data model relating to access requests with respect to job functions and physical permissions.

FIG. 10 a portion 1000 of an example IAM data model relating to access requests with respect to job functions and physical permissions is shown. In this example, an individual may be hired and assigned one or more job functions (Person To Job Function). The assigned job function may be associated with one or more business activities (Job Function To Business Activity). A business activity may be associated with logical permissions, that is, access rights defined in terms of logical resources (Business Activity To Logical Permission). These are the logical resources and access rights to the logical resource the individual may need to carry out the business activity. Logical resources may be associated with physical resources (Logical Resource To Resource).

An access request (Access Request) may be generated using the user account associated with the individual (Person→System Identifier→User Account) and a job function. The access request may be associated with a the Access Request element and one of the elements corresponding to a subtype of access request, e.g., the Access Request by Job Function element. Access request subtypes may include other attributes specific to each subtype of access request.

Business level access reviews may thus be conducted in terms of the logical permissions associated with an employee via the job function associated with the employee and the business activities associated with the job function. A manager may thus request logical permissions and perform reviews of approved access requests and associated logical entitlements.

Those skilled in the art will appreciate, with the benefit of the approach set forth above with respect to access requests by job function, that similar approaches may be employed with respect to access requests by business activity, access requests by business unit, access requests to particular logical resources, and access requests to particular physical resources. The example IAM data model set forth in FIGS. 11-26 may be implemented and utilized to manage these additional types of access requests.

As discussed above, the IAM data model includes sets of elements that model various aspects of the IAM domain. A set of elements that model an aspect of the IAM domain as used in this description refers to one or more elements that model the aspect of the IAM domain. The data model shown in the subsections throughout FIGS. 11-26 includes: i) a set of elements that model rules and attributes with respect to the IAM domain; ii) a set of elements that model credentials and authentication factors with respect to the IAM domain; iii) a set of elements that model authentication with respect to the IAM domain; iv) a set of elements that model attribute-based access control (ABAC) with respect to the IAM domain; v) a set of elements that model role-based access control (RBAC) with respect to the IAM domain; vi) a set of elements that model accounts with respect to the IAM domain; vii) a set of elements that model account levels with respect to the IAM domain; viii) a set of elements that model entities with respect to the IAM domain; ix) a set of elements that model resources with respect to the IAM domain; x) a set of elements that model identifiers with respect to the IAM domain; xi) a set of elements that model access rights and entitlements with respect to the IAM domain; xii) a set of elements that model access requests with respect to the IAM domain; xiii) a set of elements that model permissions with respect to the IAM domain.

Figure 11:
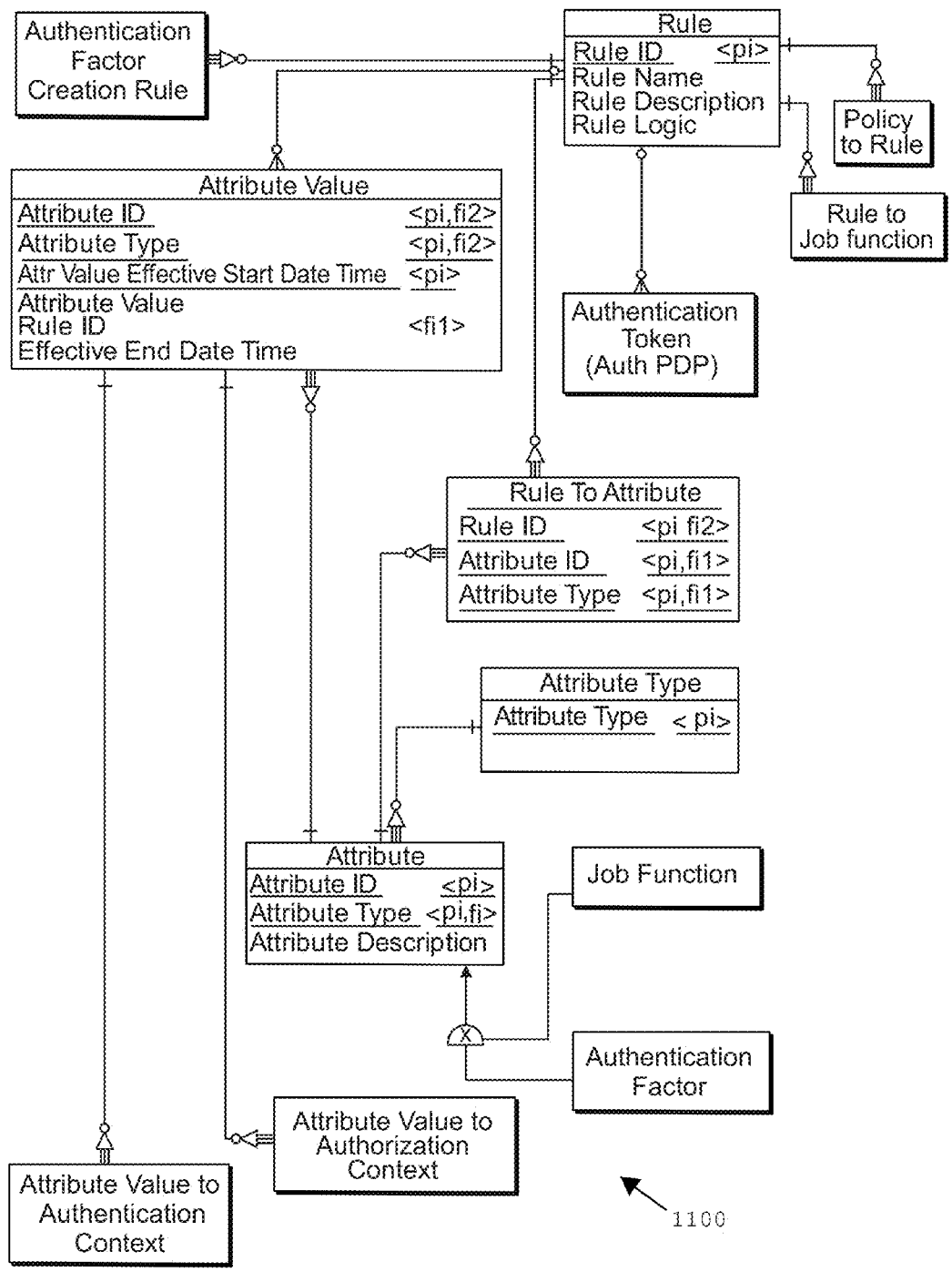
FIG. 11 is a diagram of a portion of an example IAM data model relating to rules and attributes within the IAM domain.

In FIG. 11, a portion 1100 of an example IAM data model relating to rules and attributes within the IAM domain is shown. As seen in FIG. 11, this portion of the example IAM data model includes elements for rules, attributes, attribute values, and attribute types. As also seen, types of attributes may include job functions and an authentication factors. Furthermore, the IAM data model, in this example, establishes relationships between these elements and other elements within the IAM domain including credential and authentication factors, authentication elements, authorization elements, ABAC elements, and RBAC elements.

Figure 12A:
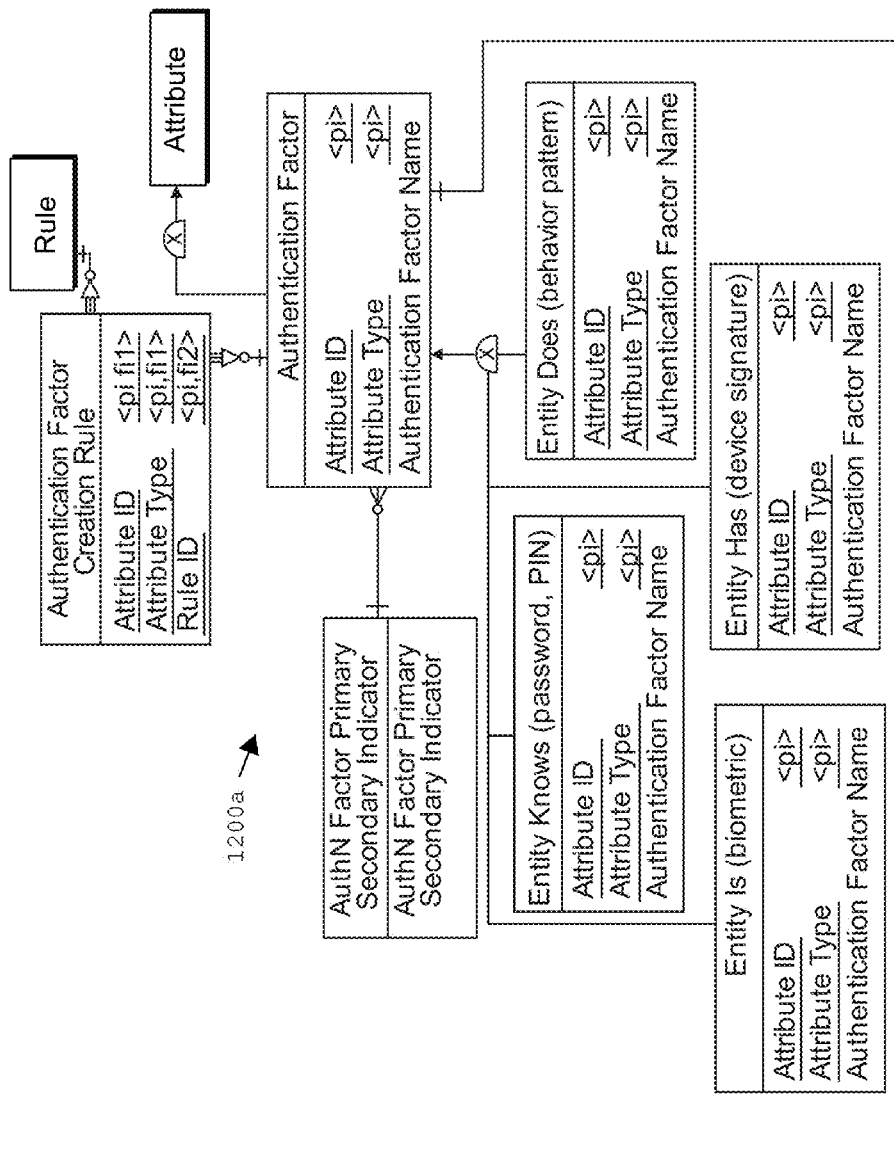
FIGS. 12A-B are diagrams of a portion of an example IAM data model relating to credentials and authentication factors within the IAM domain.
Figure 12B:
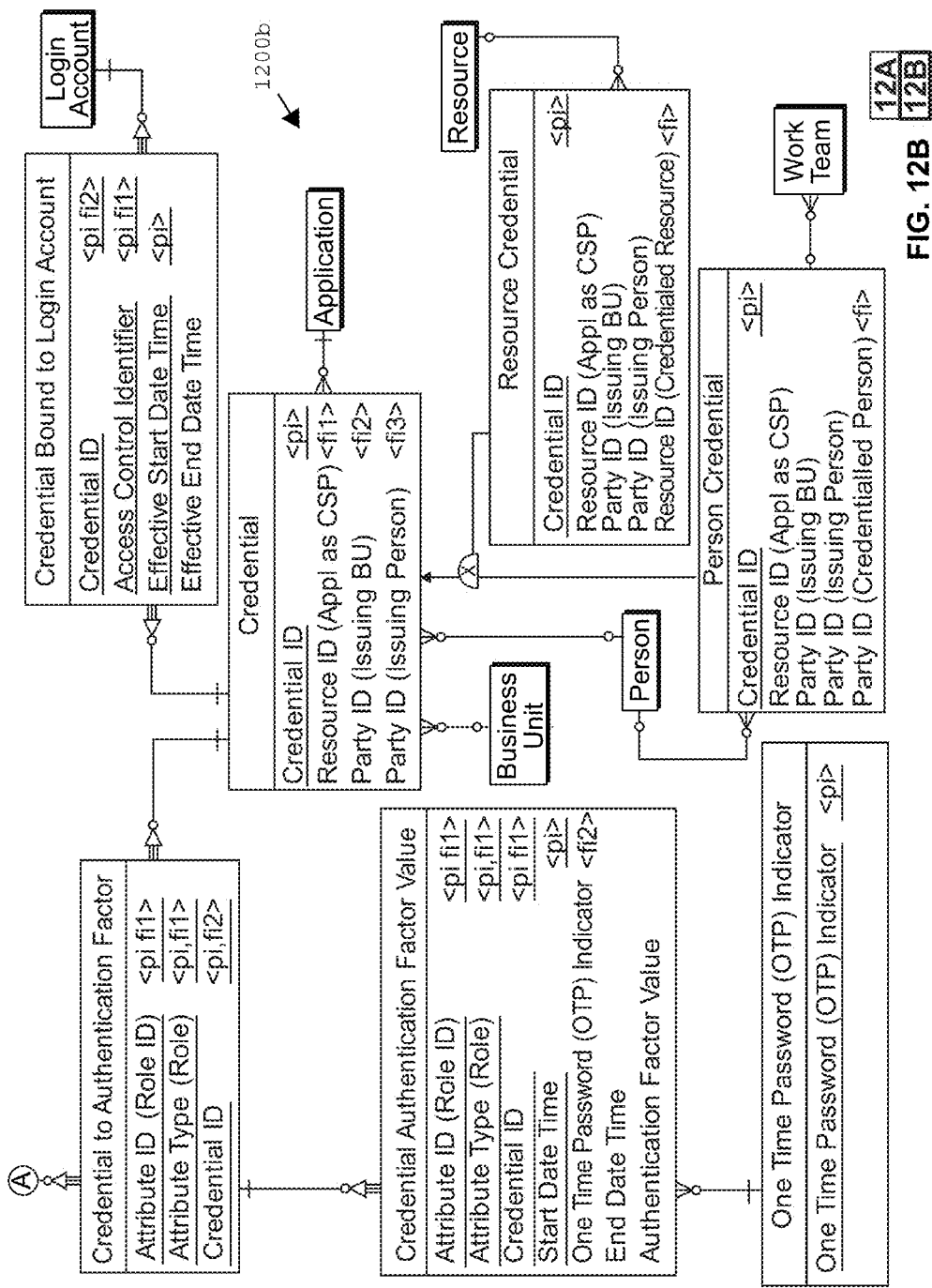

In FIGS. 12A-B, a portion 1200a-b of an example IAM data model relating to credentials and authentication factors within the example IAM domain is shown. As seen in FIG. 12-B, this portion of the IAM data model includes elements for authentication factors and credentials. Elements may also include credential authentication factor values and one-time password indicators. Authentication factor may be a type of attribute, and types of authentication factors may include what an entity is (e.g., biometric information), what an entity knows (e.g., a password or PIN number), what an entity has (e.g., a device signature), and what an entity does (e.g., a behavior pattern). Types of credentials may include resource credentials and person credentials. Furthermore, the IAM data model, in this example, establishes relationships between these elements and other elements within the IAM domain including rules and attributes, accounts, entities, and resources.

Figure 13:
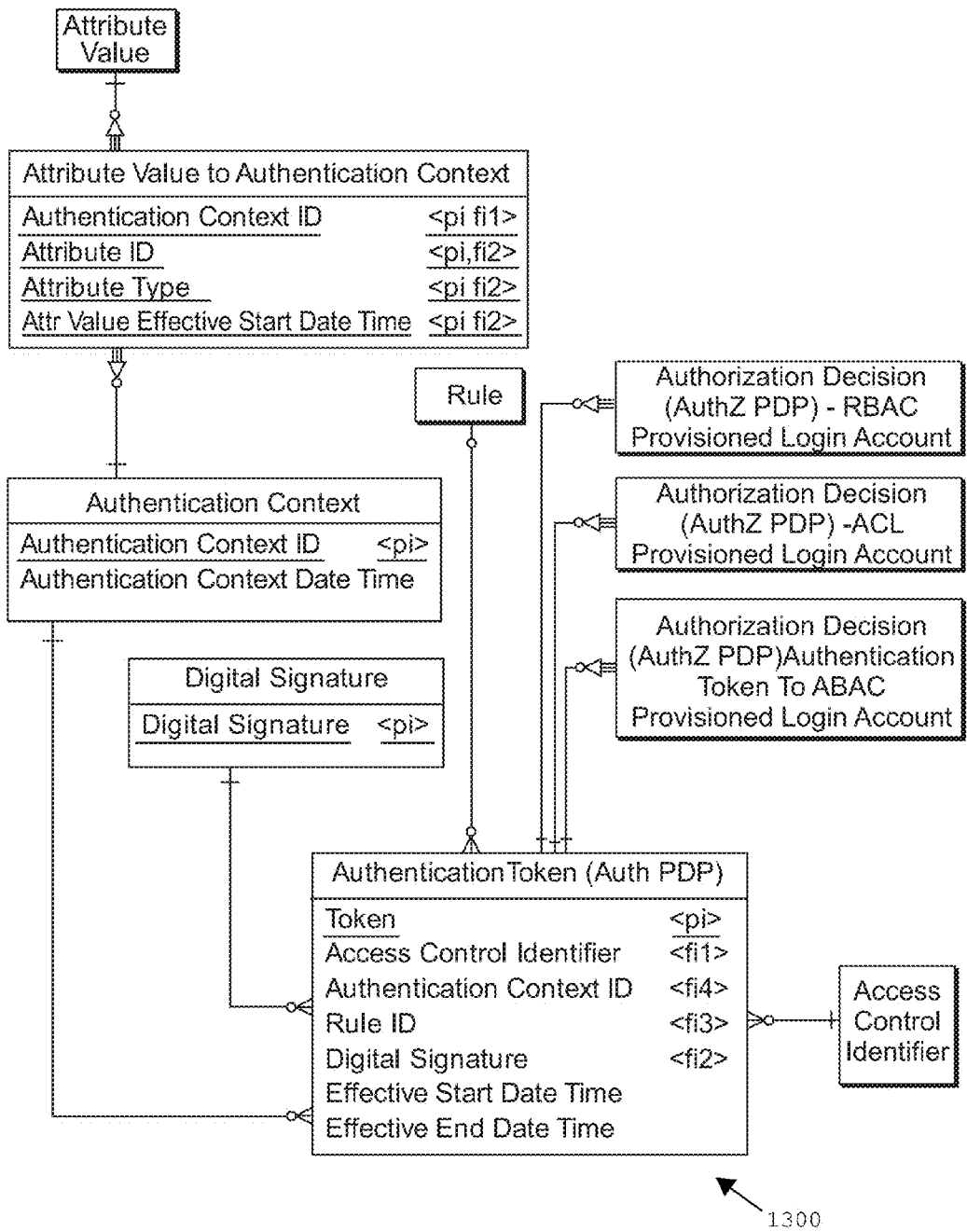
FIG. 13 is a diagram of a portion of an example IAM data model relating to authentication.

In FIG. 13, a portion 1300 of an example IAM data model relating to authentication is shown. As seen in FIG. 13, this portion of the example IAM data model includes elements for authentication tokens, authentication contexts, and digital signatures. Furthermore, the IAM data model establishes relationships between these elements and other elements within the IAM domain including rules and attributes, authorization elements, ABAC elements, RBAC elements, account elements, and account level elements.

Figure 14:
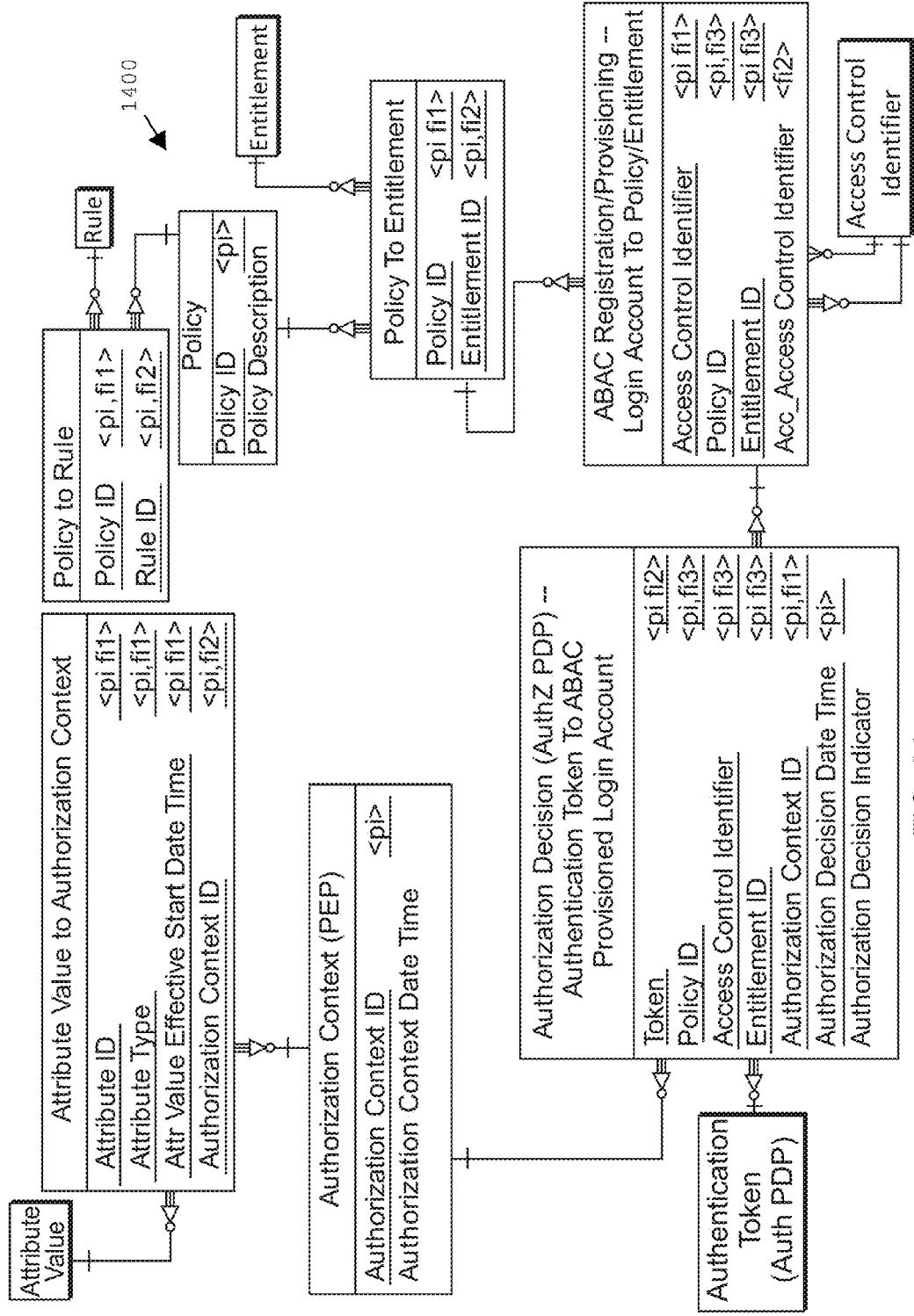
FIG. 14 is a diagram of a portion of an example IAM data model relating to attribute-based access control.

In FIG. 14, a portion 1400 of an example IAM data model relating to ABAC is shown. As seen in FIG. 14, this portion of the example IAM data model includes elements for policies, authorization contexts (e.g., policy enforcement points), ABAC registration and provisioning for login accounts, and authorization decisions (e.g., policy decision points) for ABAC provisioned ABAC login accounts. Furthermore, the IAM data model, in this example, establishes relationships between these elements and other elements within the IAM domain including rules and attributes, authentication elements, account elements, and access rights and entitlement elements.

Figure 15A:
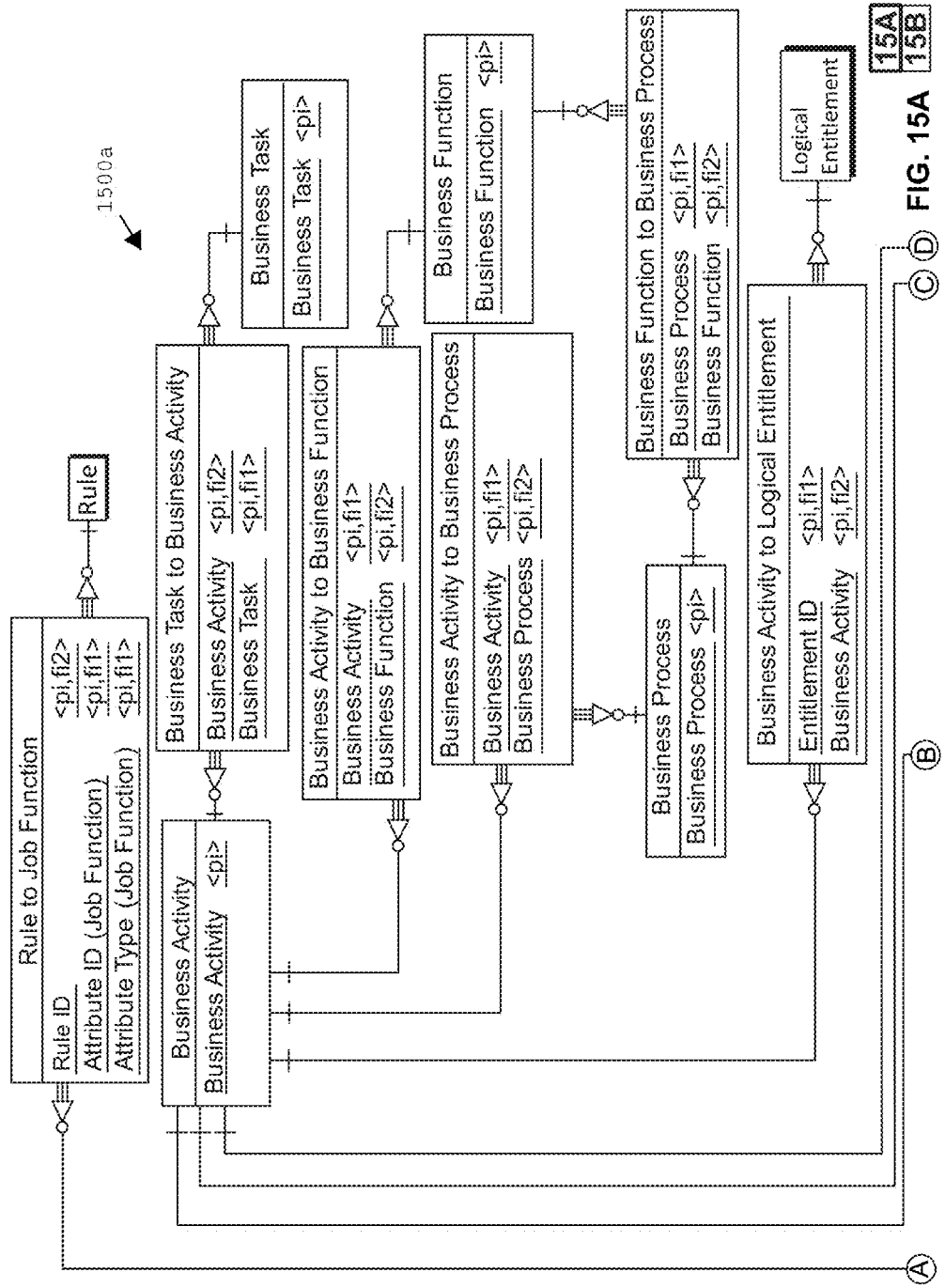
FIGS. 15A-B are diagrams of a portion of the IAM data model relating to role-based access control.
Figure 15B:
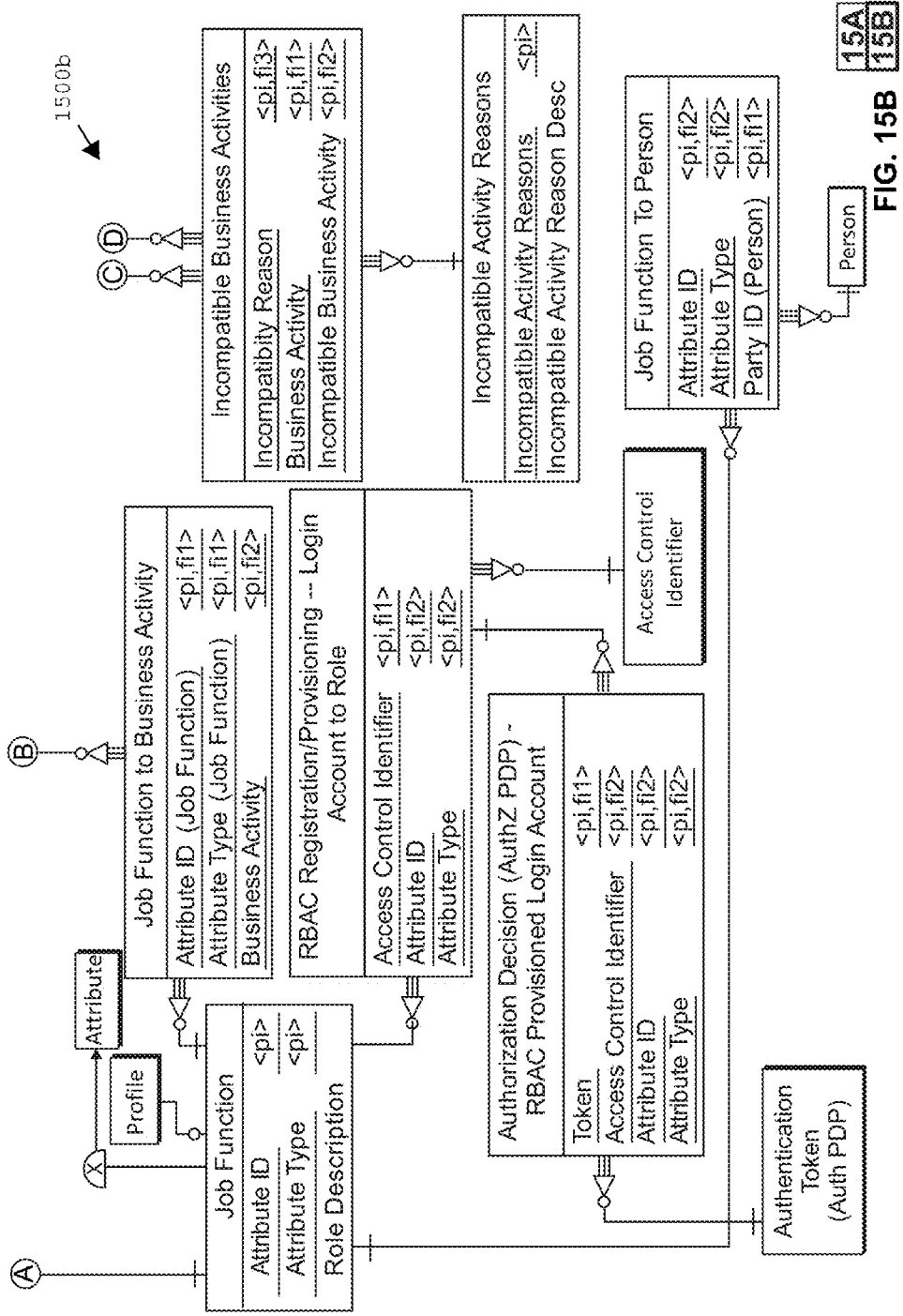

In FIGS. 15A-B, a portion 1500a-b of an example IAM data model relating to RBAC is shown. FIGS. 15A-B include the portion of the example IAM data model relating to RBAC with separation of duties. As seen in FIG. 15, these portions of the example IAM data model includes elements for business activities, business tasks, business functions, business processes, and job functions. RBAC elements may also include incompatible business activities and reasons why business activities may be incompatible. Elements may further include registration and provisioning for RBAC login accounts as well as authorization decisions (e.g., policy decision points) for RBAC provisioned login accounts. Furthermore, the IAM data model, in this example, establishes relationships between these elements and other elements within the IAM domain including rules and attributes, authentication elements, account elements, entity elements, and access right and entitlement elements.

Figure 16:
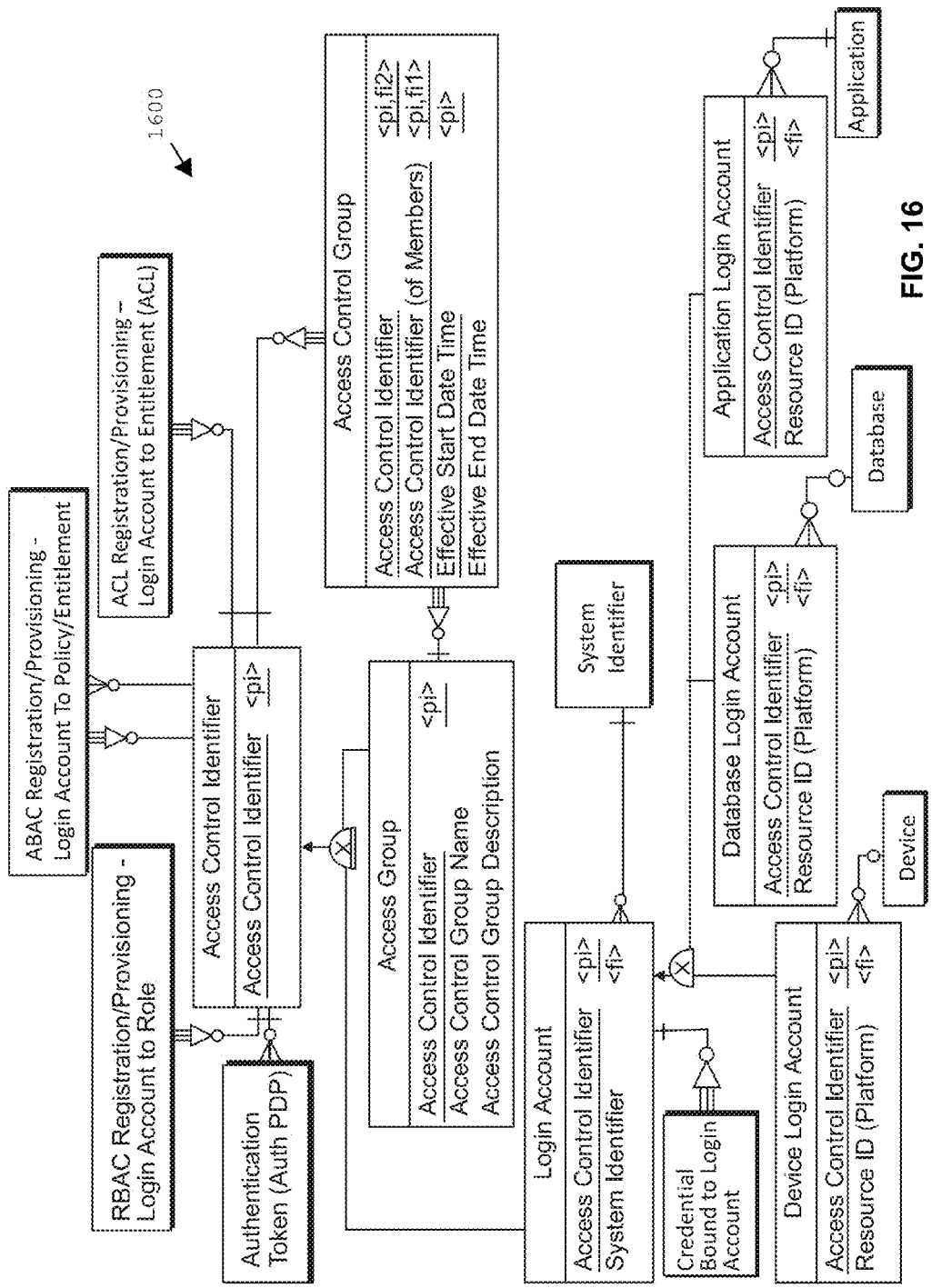
FIG. 16 is a diagram of a portion of the IAM data model relating to accounts.

In FIG. 16, a portion 1600 of an example IAM data model relating to accounts is shown. As seen in FIG. 16, this portion of the example IAM data model includes elements for access control identifiers and access control groups. Types of access control identifiers may include login accounts and access groups. Types of login accounts may include device login accounts, database login accounts, and application login accounts. Furthermore, the IAM data model, in this example, establishes relationships between these elements and other elements within the IAM domain including credentials and authentication factors, authentication elements, ABAC elements, RBAC elements, account level elements, resources, and identifiers.

Figure 17:
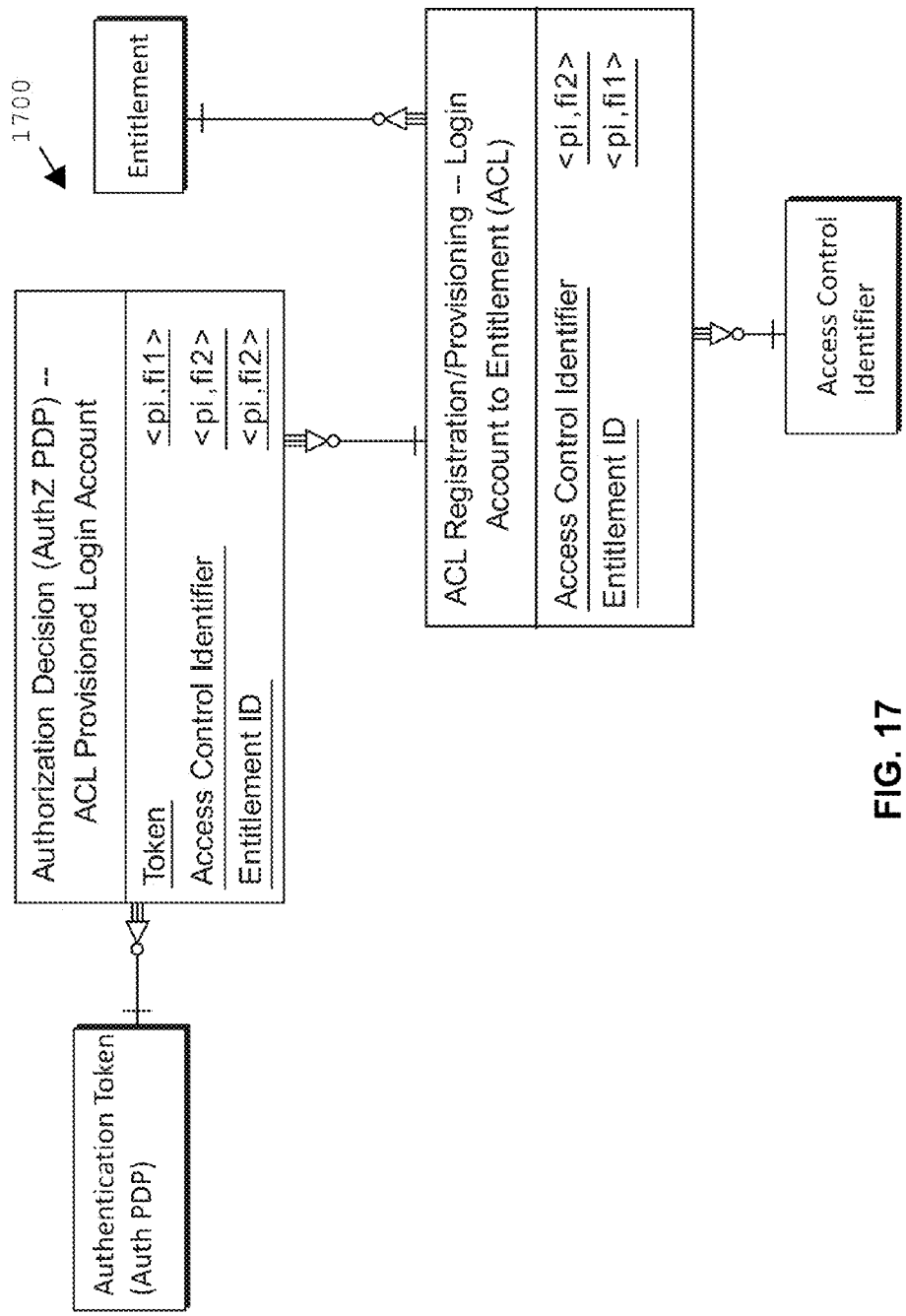
FIG. 17 is a diagram of a portion of the IAM data model relating to account levels.

In FIG. 17, a portion 1700 of an example IAM data model relating to account levels is shown. As seen in FIG. 17 this portion of the example IAM data model includes elements for registration and provisioning of access control list (ACL) login accounts as well as authorization decisions (e.g., policy decision points) for ACL provisioned login accounts. Furthermore, the IAM data model, in this example, establishes relationships between these elements and other elements within the IAM domain including authentication elements, account elements, and access right and entitlement elements.

Figure 18A:
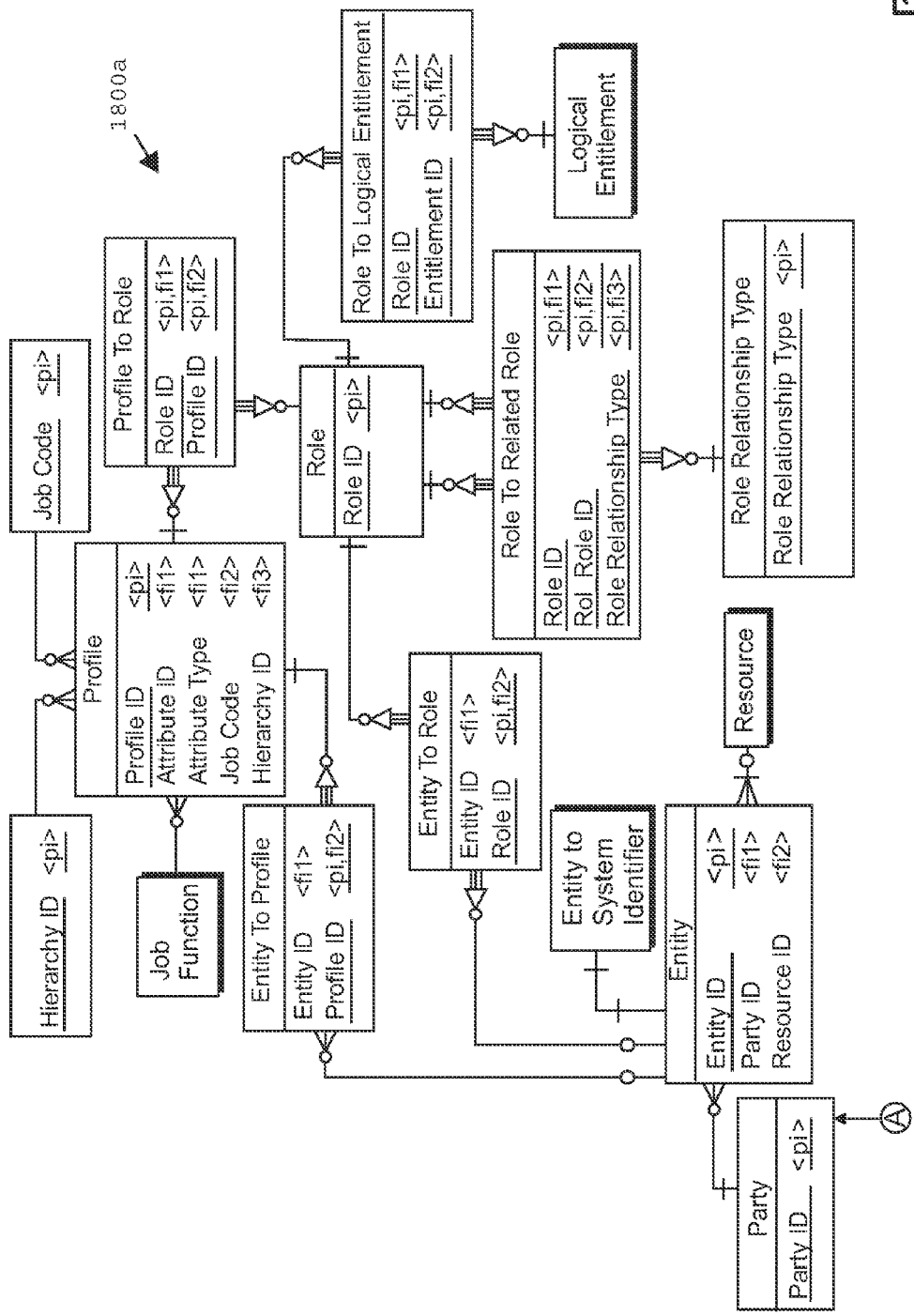
FIGS. 18A-B are diagrams of a portion of the IAM data model relating to entities and profiles.
Figure 18B:
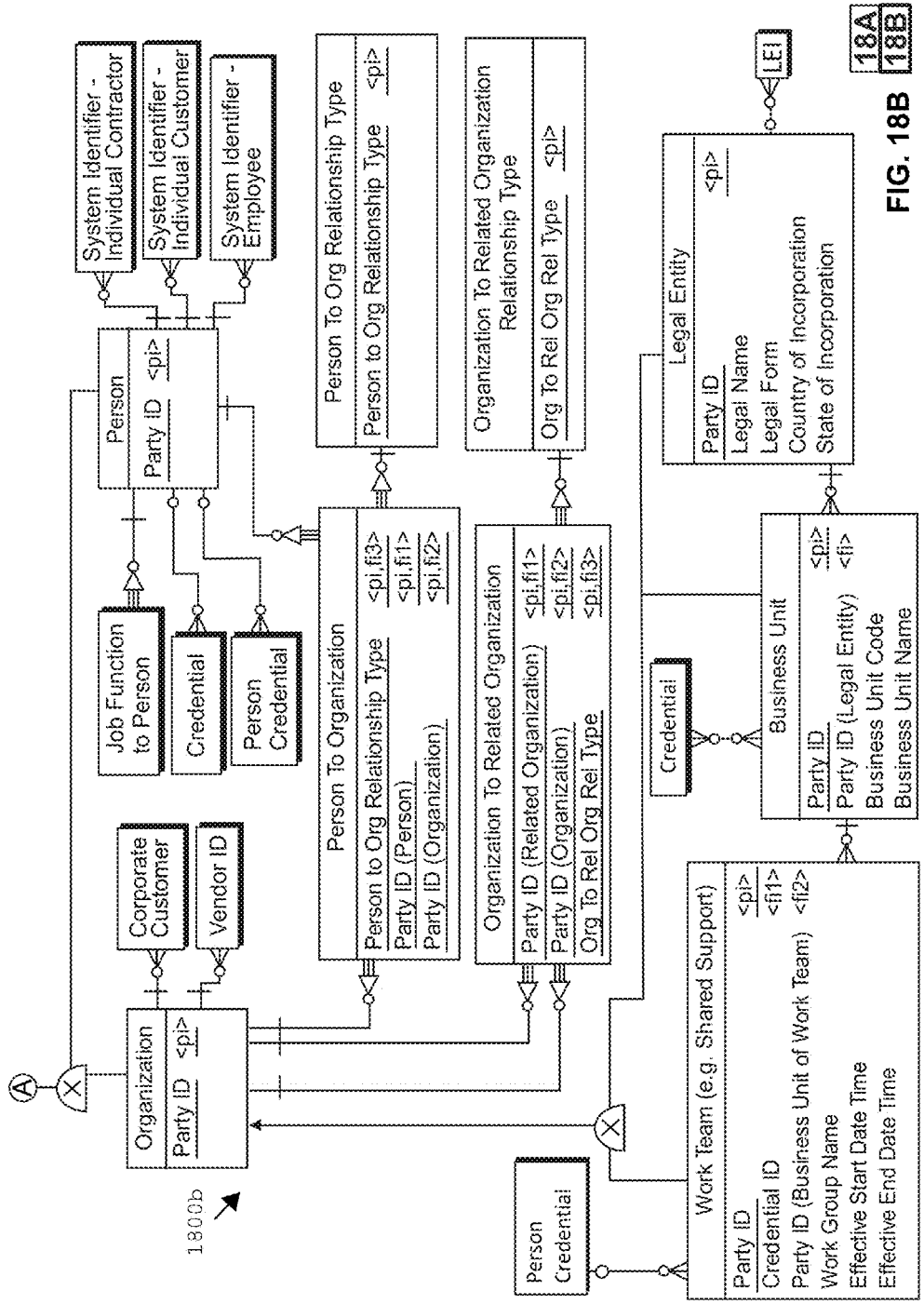

In FIGS. 18A-B, a portion 1800a-b of an example IAM data model relating to entities and profiles is shown. As seen in FIGS. 18A-B, these portions of the example IAM data model includes elements for entities, parties, profiles, and roles. Elements may also include hierarchies and job codes. Types of parties may include persons and organizations. Types of organizations may include work teams, business units, and legal entities. The IAM data model may also include elements for types of relationships including role-role relationships, person-organization relationships, organization-to-organization relationships. Furthermore, the IAM data model, in this example, establishes relationships between these elements and other elements within the IAM domain including credentials and authentication factors, RBAC elements, resources, identifiers, and access rights and entitlements.

Figure 19A:
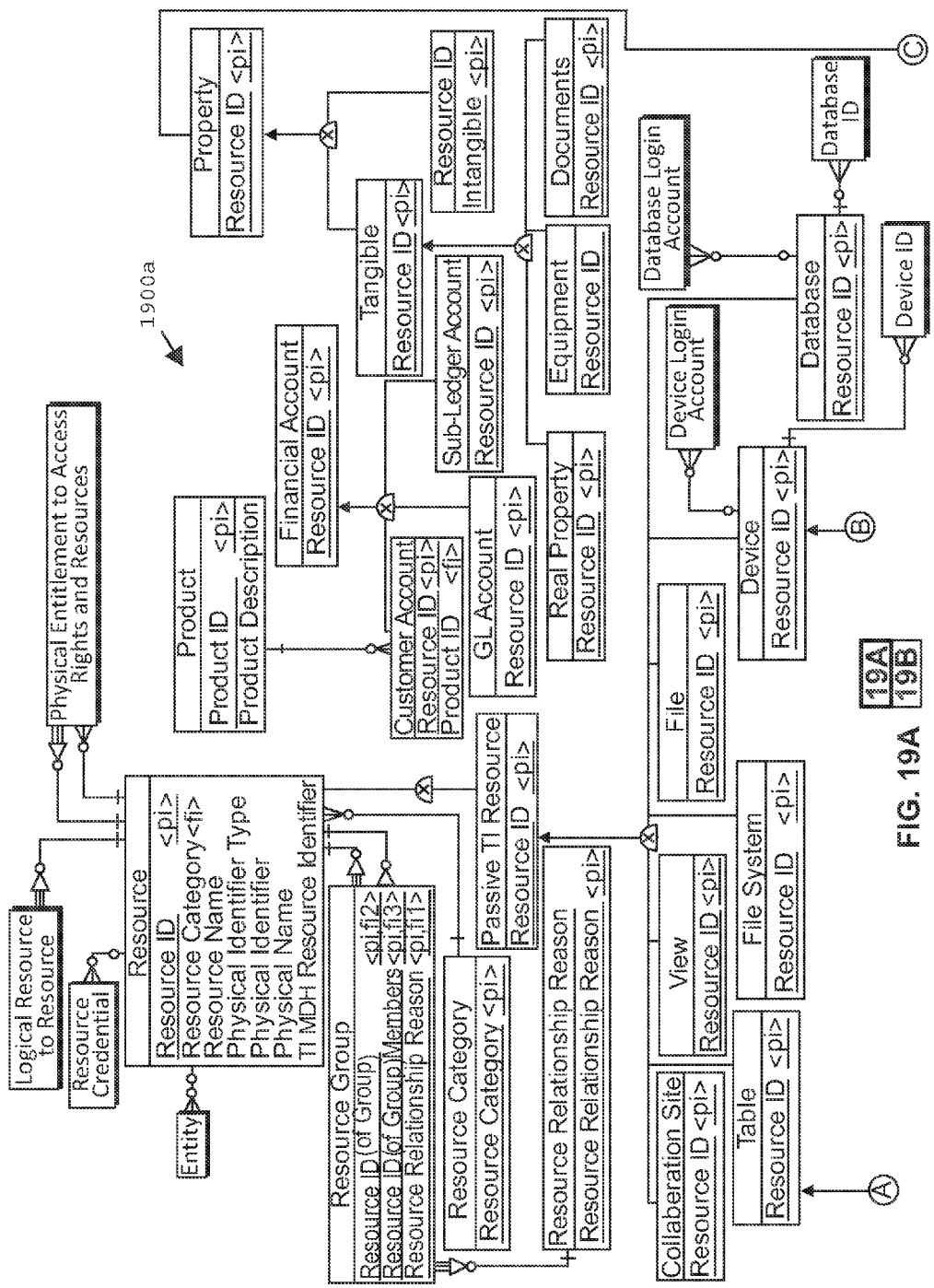
FIGS. 19A-B is a diagram of a portion of the IAM data model relating to resources.
Figure 19B:
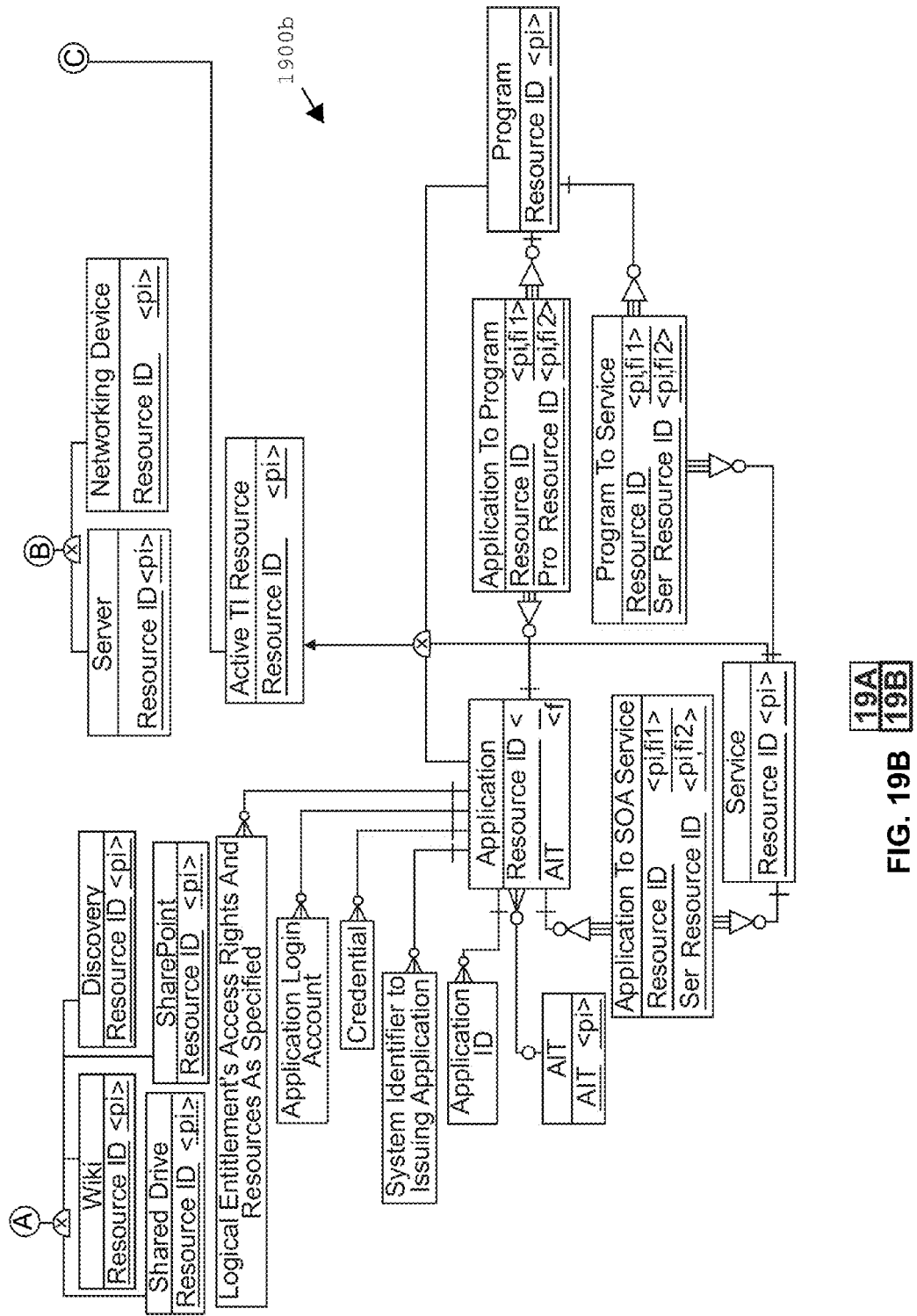

In FIGS. 19A-B, a portion 1900a-b of an example IAM data model relating to resources is shown. As seen in FIGS. 19A-B, these portions of the example IAM data model includes elements for resources, resource groups, resource categories, and reasons to relate resources. Types of resources may include active resources, passive resources, financial accounts, and property. Types of active resources may include applications, programs, and services. Types of passive resources may include collaboration sites, tables, views, file systems, files, devices, and databases. Types of collaboration sites may include shared drives, wikis, share points, and discoveries. Types of devices may include servers and other networking devices. Types of financial accounts may include customer accounts, general ledger accounts, and sub-ledger accounts. Types of property may include tangible property and intangible property. Types of intangible property may include real property and equipment. Furthermore, the IAM data model, in this example, establishes relationships between these elements and other elements within the IAM domain including credentials and authentication factors, account elements, entities, identifiers, and access rights and entitlements.

Figure 20:
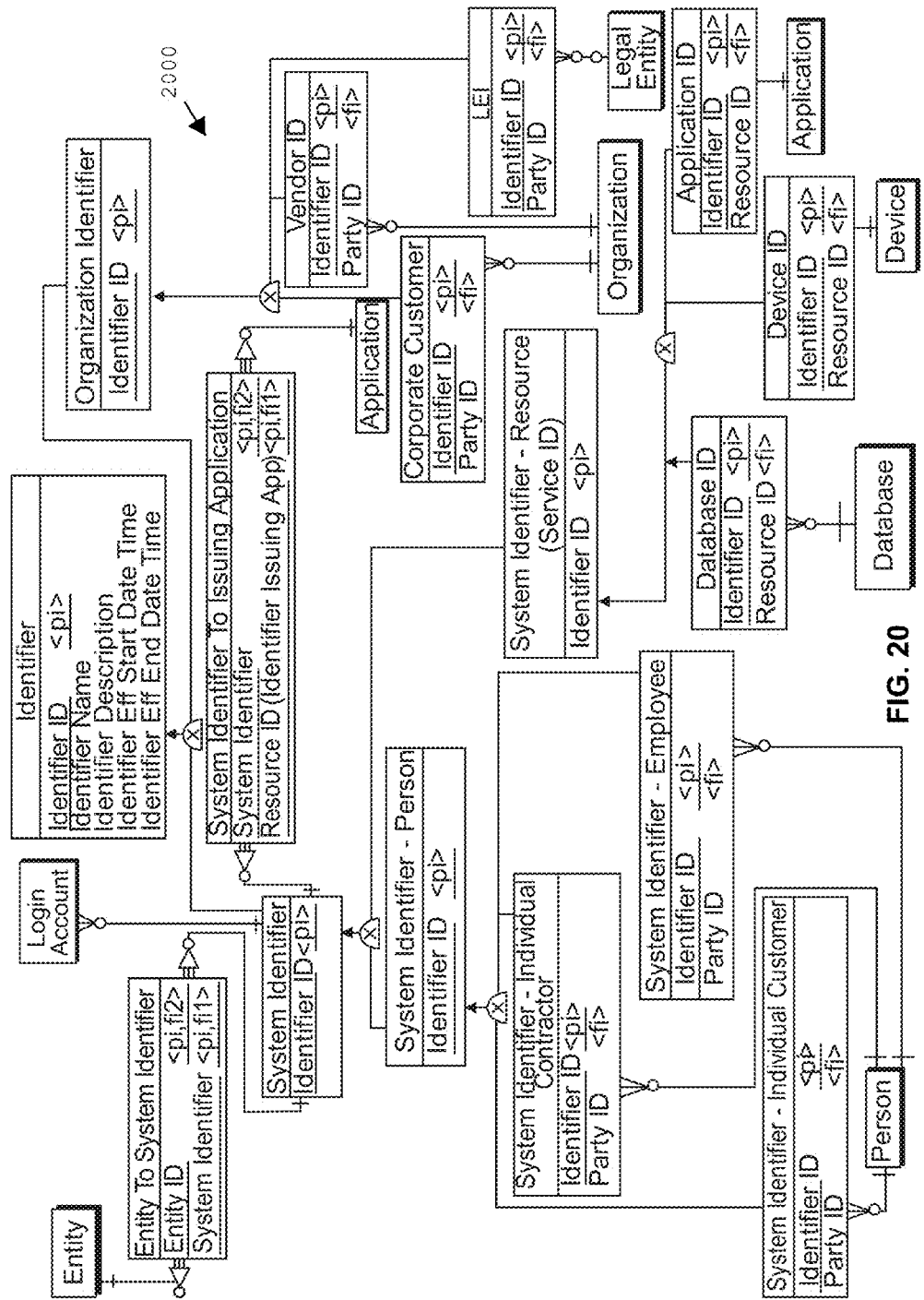
FIG. 20 is a diagram of a portion of the IAM data model relating to identifiers.

In FIG. 20, a portion 2000 of an example IAM data model relating to identifiers is shown. As seen in FIG. 20, this portion of the example IAM data model includes elements for identifiers. Types of identifiers may include system identifiers and organization identifiers. Types of organization identifiers may include corporate customer identifiers, vendor identifiers, and legal entity identifiers. Types of system identifiers may include person identifiers and resource identifiers. Person identifiers may include individual customer identifiers, individual contractor identifiers, and individual employee identifiers. System identifiers may include database identifiers, device identifiers, and legal entity identifiers. Furthermore, the IAM data model, in this example, establishes relationships between these elements and other elements within the IAM domain including account elements, entities, and resources.

Figure 21A:
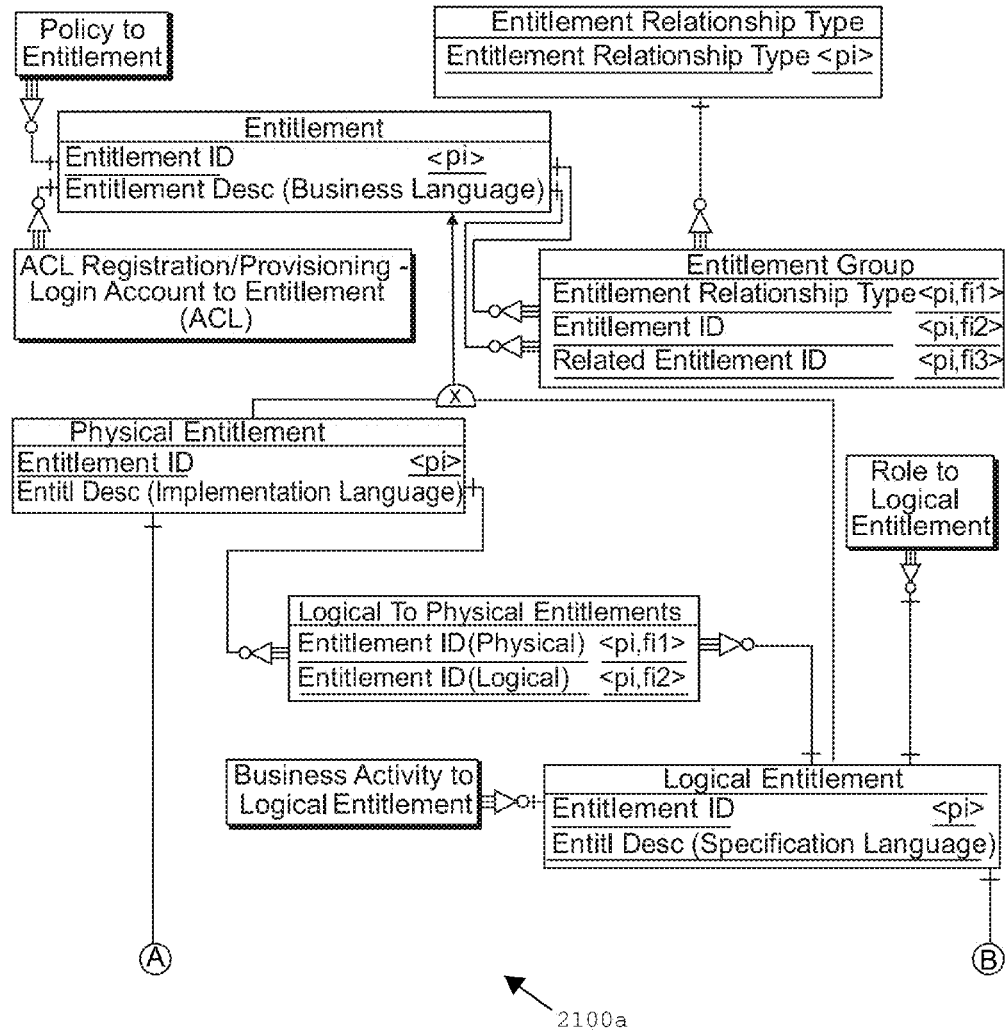
FIGS. 21A-B is a diagram of a portion of the IAM data model relating to access rights and entitlements.
Figure 21B:
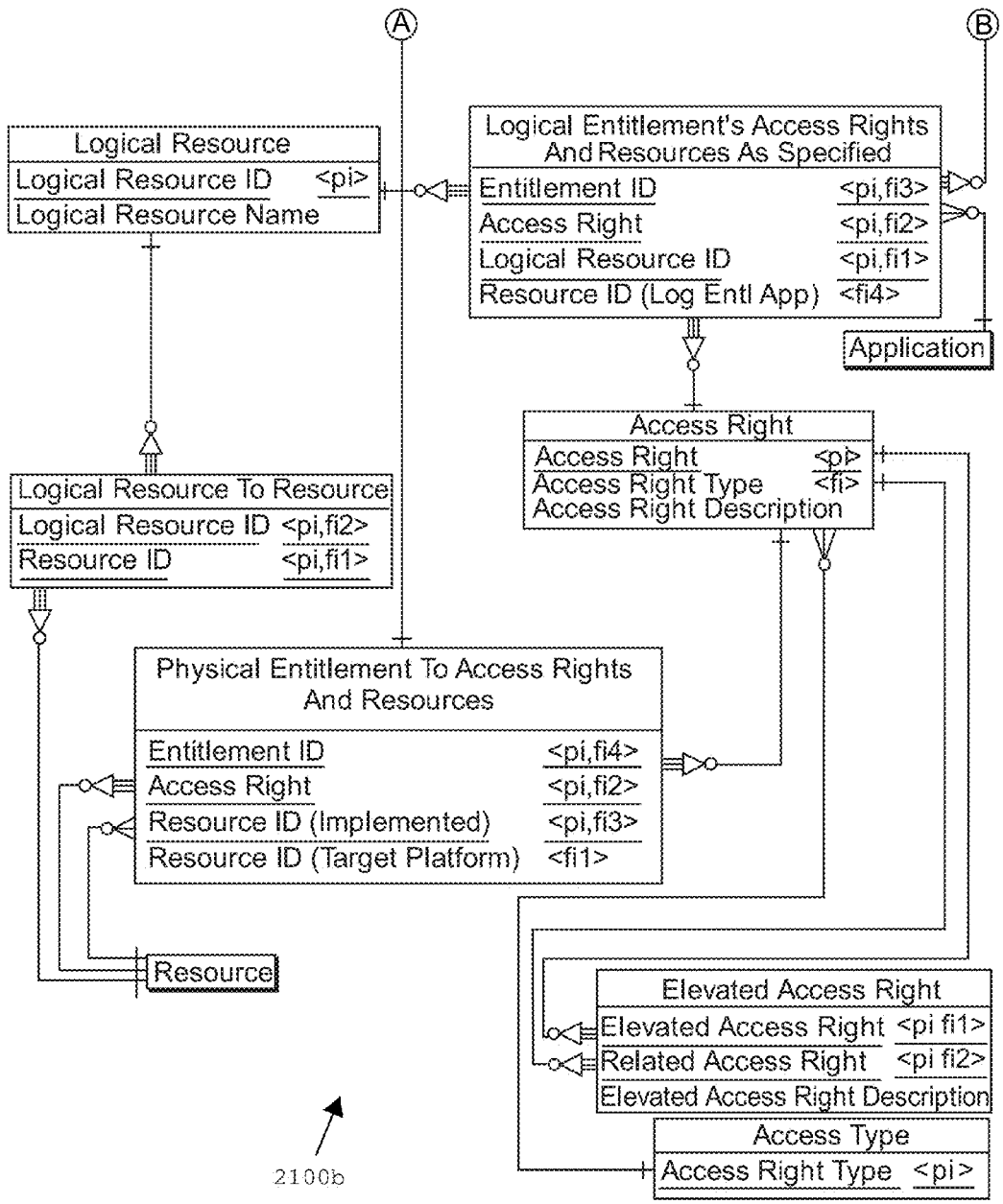

In FIGS. 21A-B, a portion 2100a-b of an example IAM data model relating to access rights and entitlements is shown. As seen in FIGS. 21A-B, these portions of the example IAM data model includes elements for entitlements, entitlement groups, entitlement relationship types, access rights, elevated access rights, access types, and logical resources. Types of entitlements may include physical entitlements and logical entitlements. Furthermore, the IAM data model, in this example, establishes relationships between these elements and other elements within the IAM domain including ABAC elements, RBAC elements, account level elements, entities, and resources.

Figure 22A:
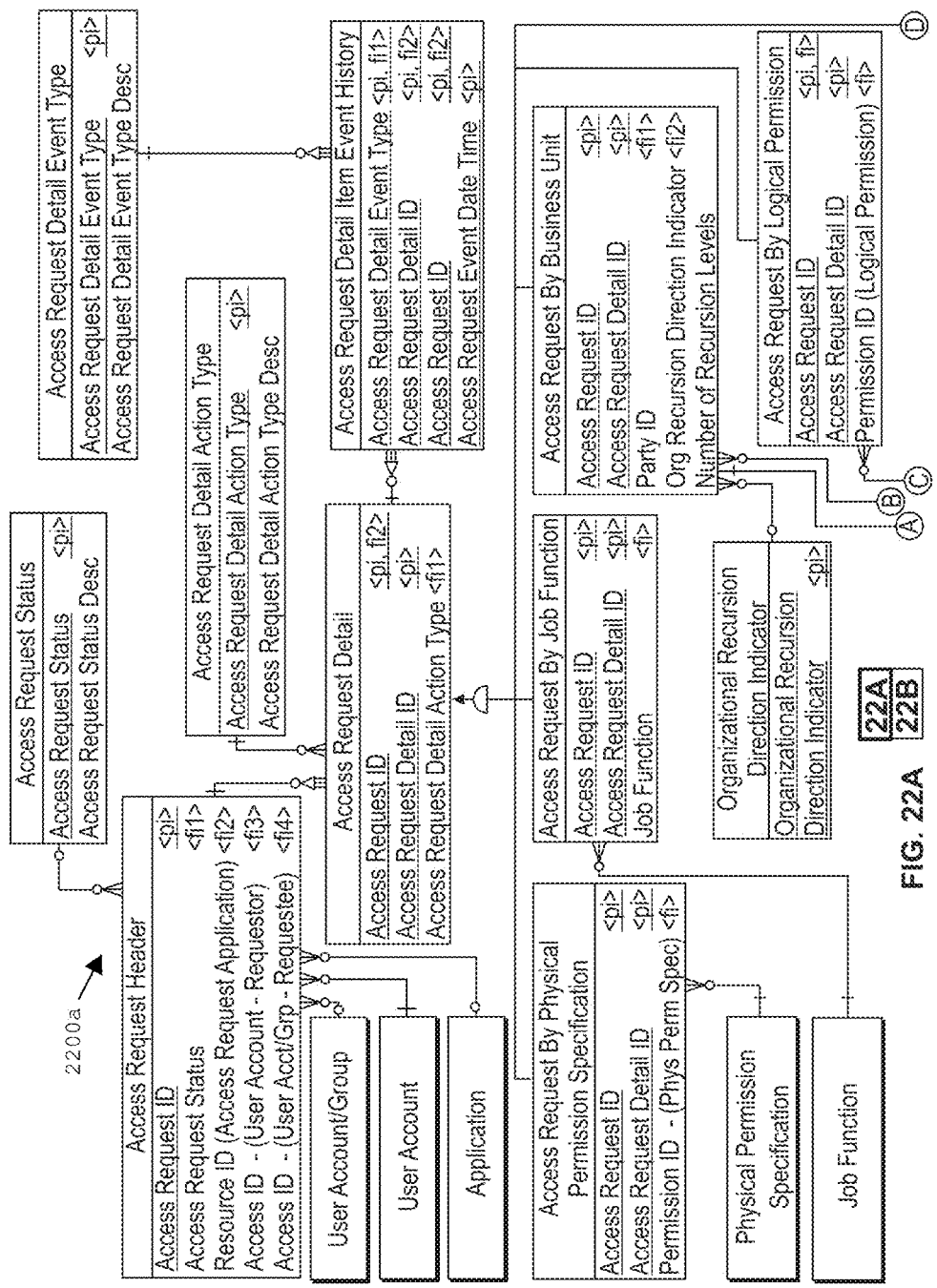
FIGS. 22A-B are diagrams of a portion of an example IAM data model relating to access requests.
Figure 22B:
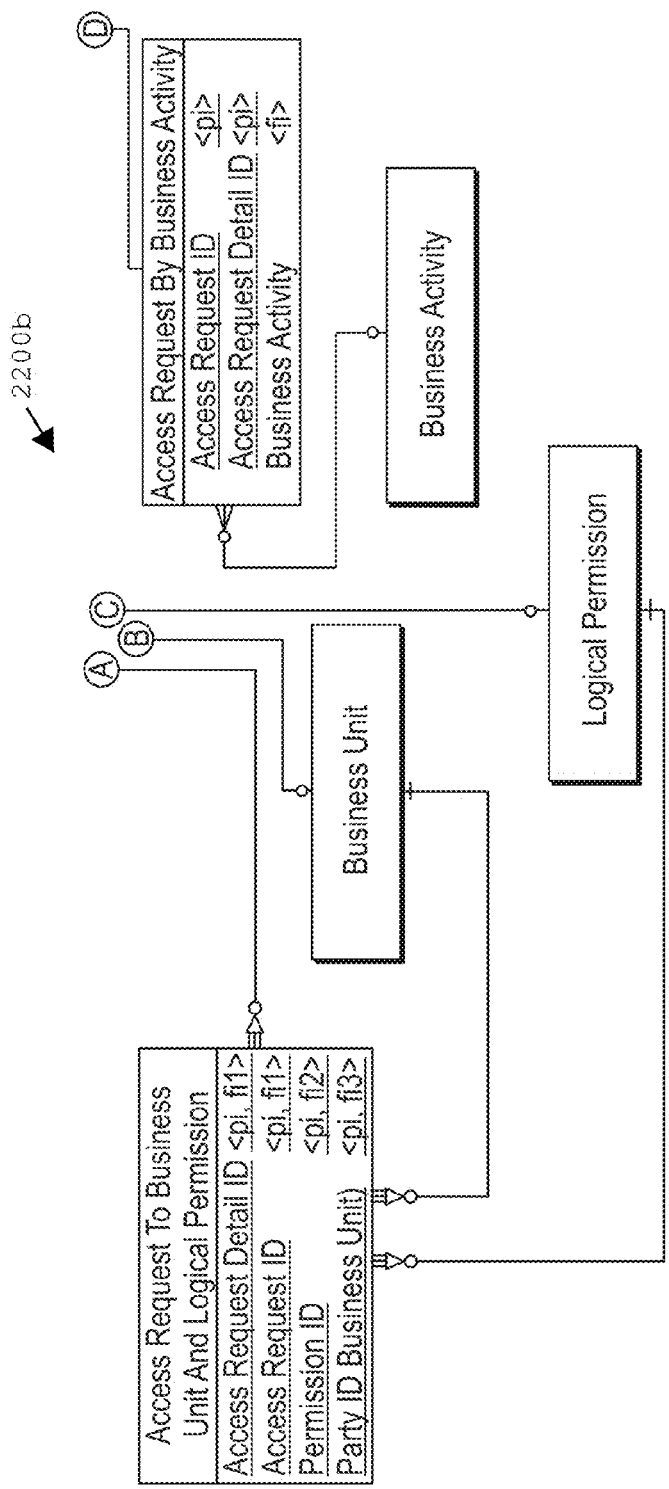

In FIGS. 22A-B, a portion 2200a-b of an example IAM data model relating to access requests is shown. As seen in FIGS. 22A-B, this portion of the example IAM data model includes elements for access request details, access request headers, access request statuses, action types for access requests, item event histories for access request, and event types for item event histories. Types of access requests may include access requests by job function, access requests by business unit, access requests by business activity, access requests by physical permission specification, and access requests by logical permission. This portion of the example IAM data model also includes indicators for the direction of organizational recursion. Furthermore the IAM data model, in this example, establishes relationships between these elements and other elements within the IAM domain including, user accounts, user groups, applications, physical permission specifications, job functions, business units, business activities, and logical permissions.

Figure 23A:
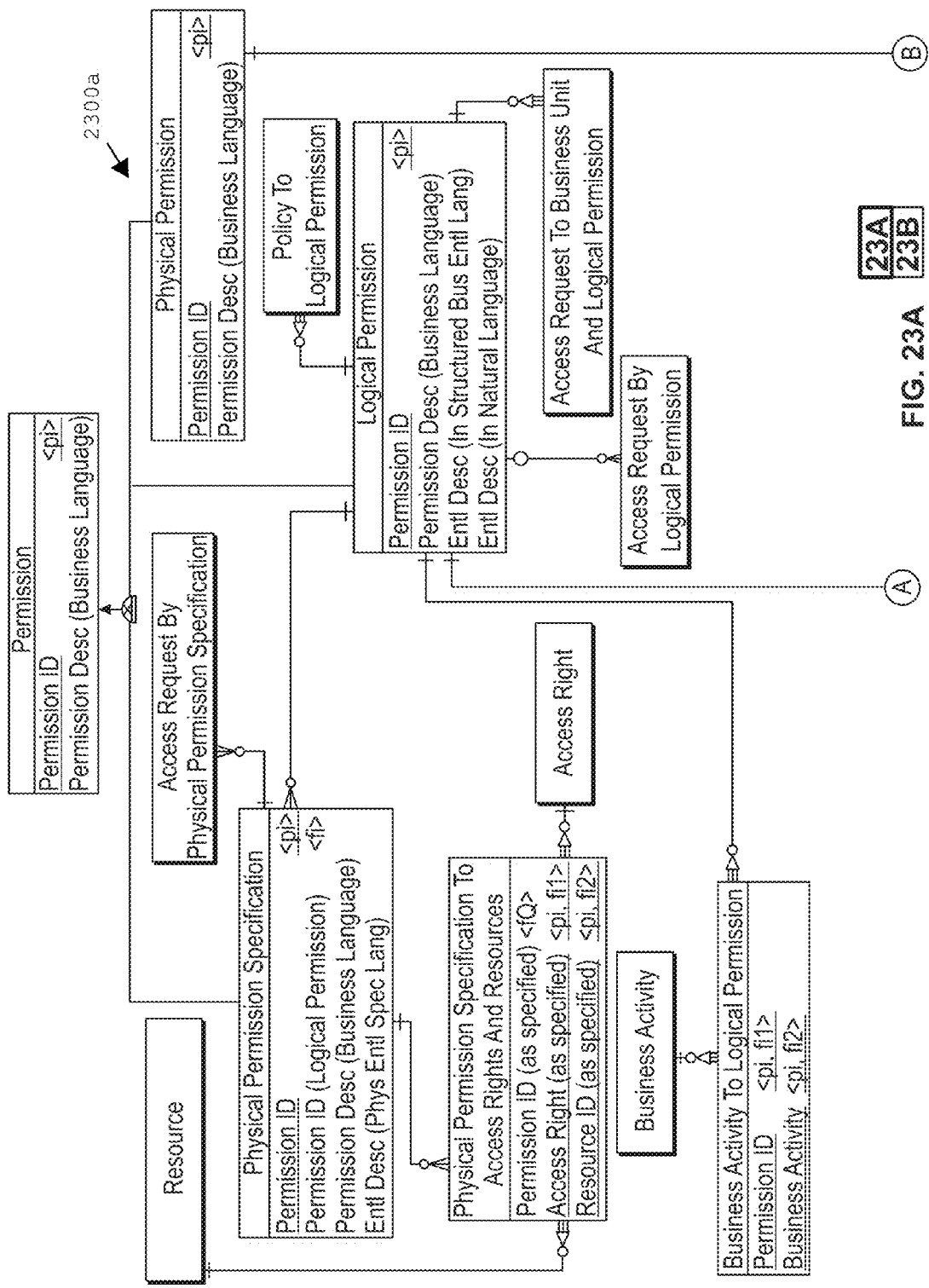
FIGS. 23A-B are diagrams of a portion of an example IAM data model relating to permissions.
Figure 23B:
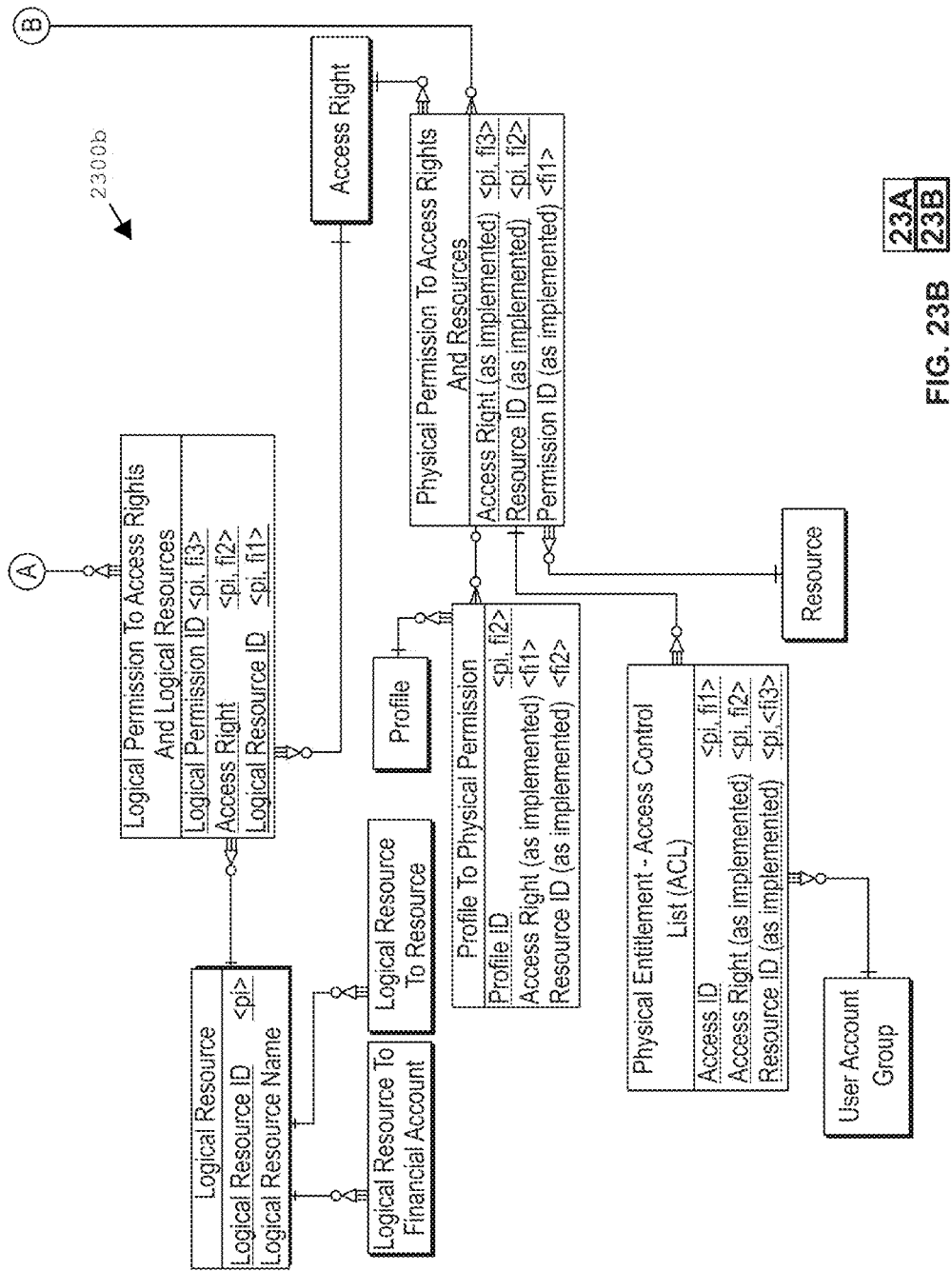

In FIGS. 23A-B, a portion 2300a-b of an example IAM data model relating to permissions is shown. As seen in FIGS. 23A-B, this portion of the example IAM data model includes elements for permissions. Types of permissions may include physical permissions, logical permissions, and physical permission specifications. Furthermore, the IAM data model, in this example, establishes relationships between these elements and resources, access requests, policies, access rights, business activities, logical resources profiles, and user account groups.

Figure 24:
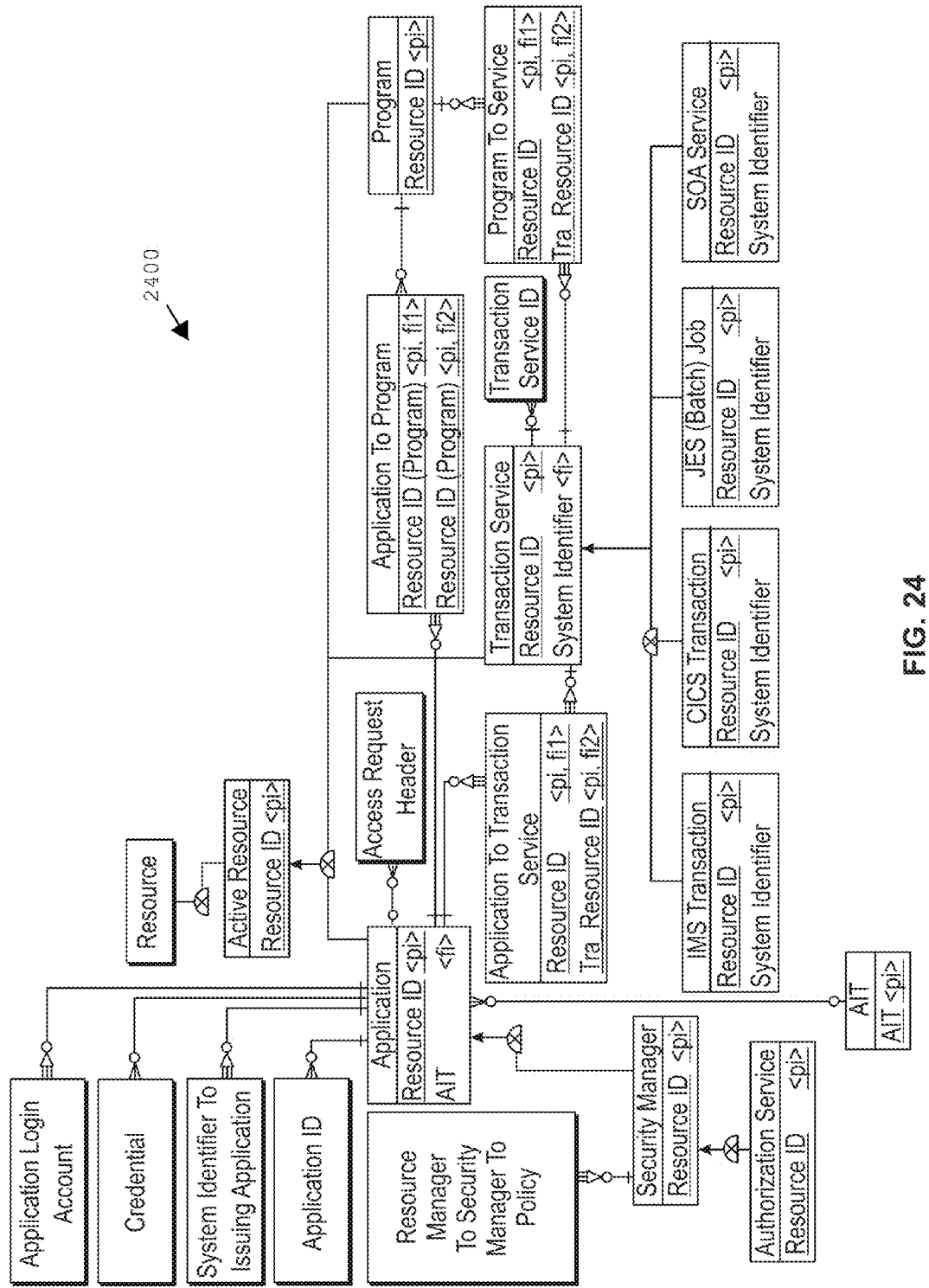
FIG. 24 is a diagram of another portion of an example IAM data model relating to resources.

In FIG. 24, another portion 2400 of an example IAM data model relating to resources is shown. As seen in FIG. 24, this portion of the example IAM data model identifies additional types of active resources including applications, transaction services, and programs. A security manager may be a type of application, and an authorization service may be a type of security manager. Types of transaction services may include system transactions, server transactions, batch jobs, and other services of service-oriented architectures (SOA).

Figure 25A:
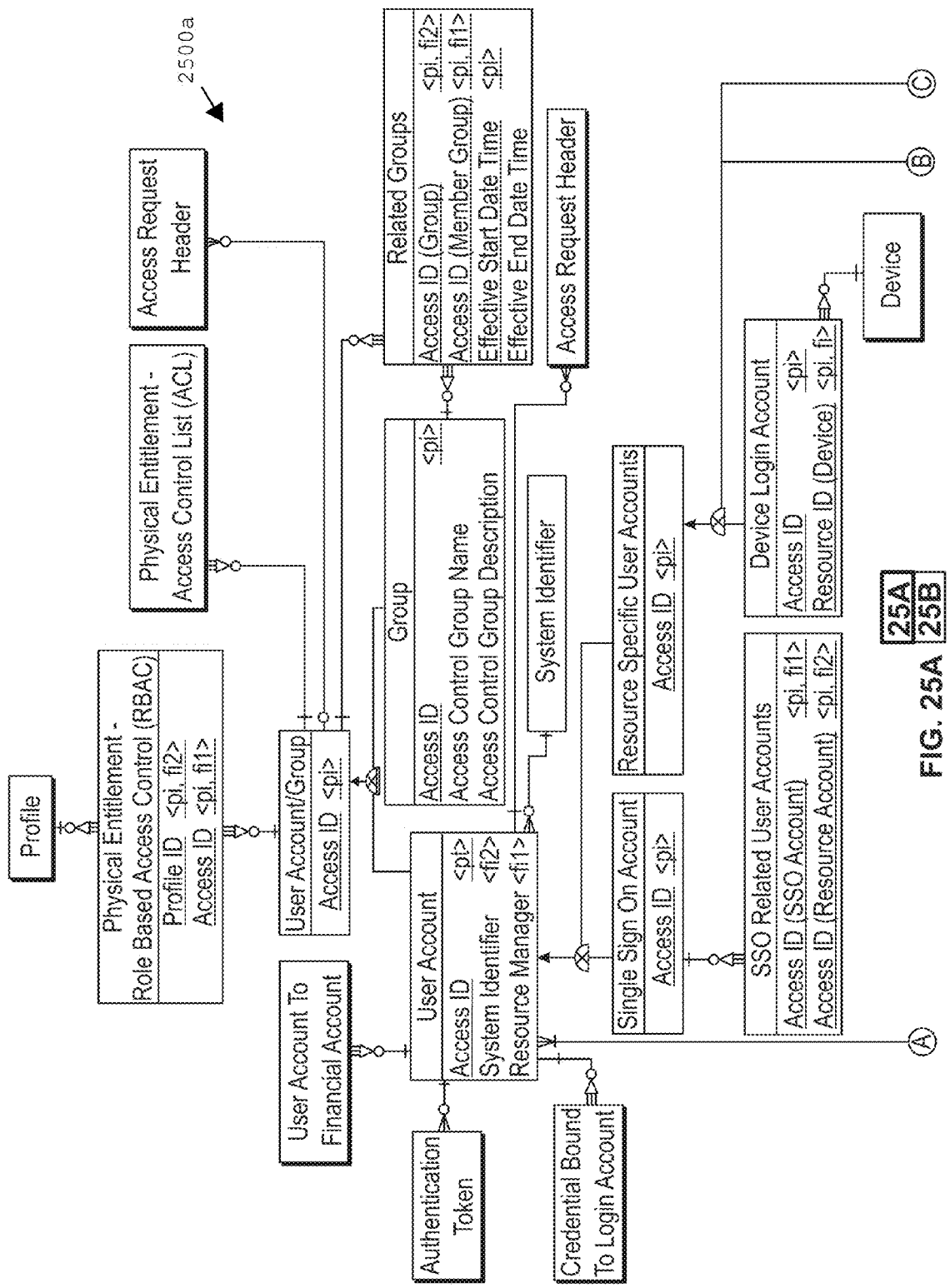
FIGS. 25A-B are diagrams of another portion of an example IAM data model relating to accounts.
Figure 25B:
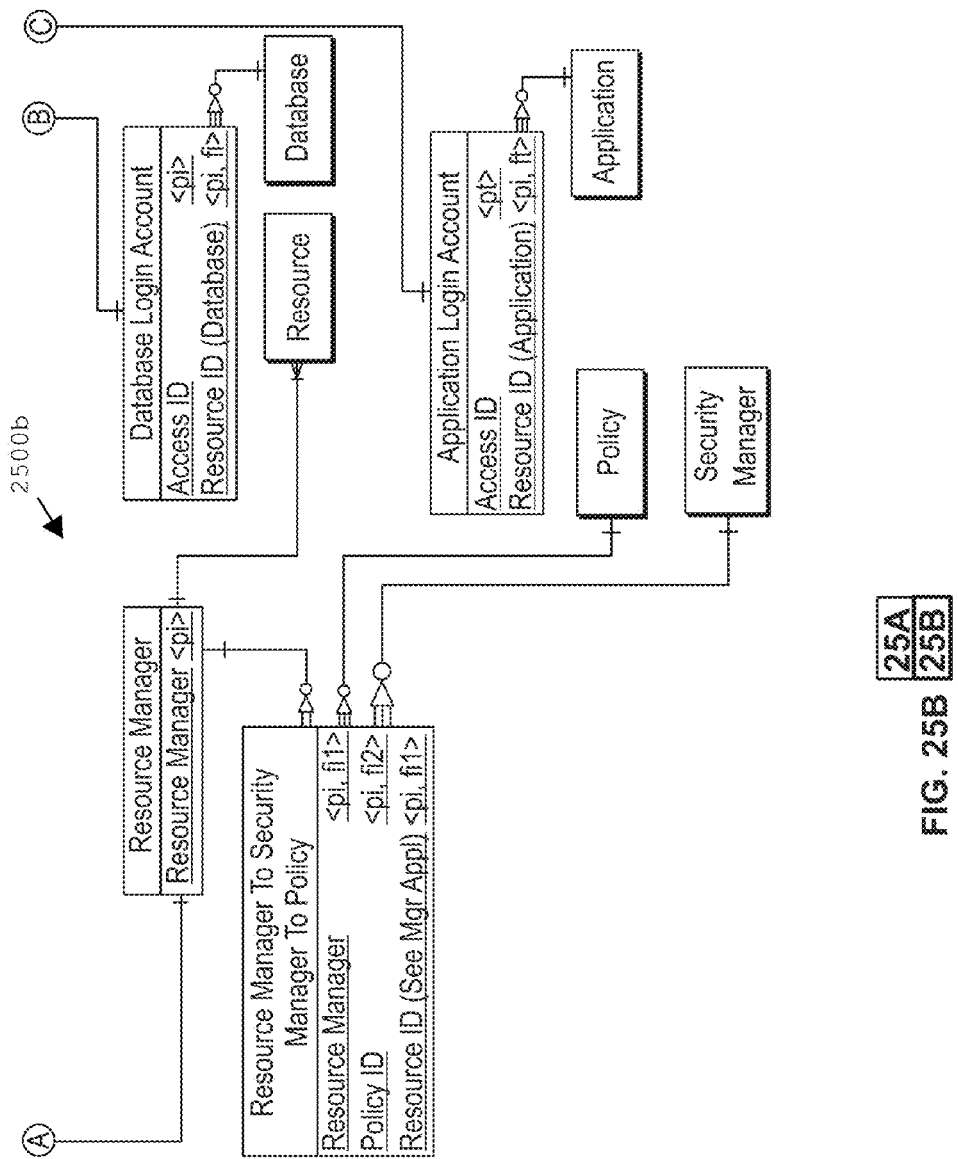

In FIGS. 25A-B, another portion 2500 of an example IAM data model relating to accounts is shown. As seen in FIGS. 25A-B, this portion of the example IAM data model identifies additional types of user accounts including single sign on (SSO) accounts and resource specific user accounts. Types of resource specific user accounts may include, for example, device login accounts, database login accounts, and application login accounts. A resource manager may also be associated with a policy and a security manager.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for managing identity and access management (IAM) data comprising:
   an IAM data model that models an IAM domain space using a common IAM data format, the IAM data model defining a logical computing resource entity, a physical computing resource entity, and a relationship between the logical computing resource entity and the physical computing resource entity;
   a mapping module implemented at a computing device wherein the mapping module is configured to transform heterogeneous IAM data provided by a plurality of IAM data sources based on the IAM data model into homogenous IAM data formatted according to the common IAM data format;
   a data store of the computing device that implements the IAM data model such that the data store is configured to store the homogeneous IAM data as a set of database records, the set of database records conforming to the IAM data model, the set of database records comprising (a) a set of physical computing resource records, each physical computing resource record conforming to the physical computing resource entity and corresponding to one of a plurality of physical computing resources of a computing system, and (b) a set of logical computing resource records, each logical computing resource record conforming to the logical computing resource entity and indicating at least one of the plurality of physical computing resources that implements the logical computing resource at the computing system; and
   an access request manager configured to change access rights for a user account using the IAM data model by:
   i) receiving a request to change access rights for the user account, wherein the request indicates one of a job function, a business activity, or a business unit,
   ii) evaluating the homogenous IAM data to identify a logical computing resource associated with the job function, the business activity, or the business unit indicated in the request, and to identify a logical permission to change with respect to the logical computing resource identified,
   iii) evaluating the homogenous IAM data to identify a physical computing resource that implements the logical computing resource identified,
   iv) obtaining, from the homogenous IAM data, a physical permission specification associated with the physical computing resource identified, the physical permission specification mapping the logical permission to at least one physical permission that implements the logical permission at the physical computing resource, and
   v) initiating a change to the access rights for the user account with respect to the physical computing resource identified based on the at least one physical permission of the physical permission specification wherein the change to the access rights either provisions the at least one physical permission to the physical computing resource for the user account or revokes the at least one physical permission to the physical computing resource from the user account.

2. The system of claim 1 wherein the mapping module is a first mapping module and further comprising a second mapping module implemented at the computing device wherein the second mapping module is configured to transform at least a portion of the homogeneous IAM into reformatted IAM data having a format specified by a data analysis tool.

3. The system of claim 1 wherein:
   the IAM data model further defines an account entity, and wherein the set of database records further comprises (c) a set of account records, each account record conforming to the account entity and corresponding to one of a plurality of user accounts of the computing system; and
   the IAM data model further defines a physical entitlement entity, a physical permission entity, a first relationship between the physical entitlement entity the physical permission entity, and a second relationship between the physical entitlement entity and the account entity, and wherein the set of database records further comprises (d) a set of physical permission records, each physical permission record corresponding to the physical permission entity and indicating a physical permission associated with one of the plurality of physical computing resources and (e) a set of physical entitlement records, each physical entitlement record conforming to the physical entitlement entity and indicating one of the account records and one of the physical permission records.

4. The system of claim 3 wherein:
   the IAM data model further defines a business task entity, and wherein the set of database records further comprises (f) a set of business task records, each business task record conforming to the business task entity and corresponding to a business task of an enterprise that provides the computing system;
   the IAM data model further defines a business activity entity and a relationship between the business activity entity and the business task entity, wherein the set of database records further comprises (g) a set of business activity records, each business activity record conforming to the business activity entity and corresponding to a business activity of the enterprise, and wherein one or more business task records of the set of business task records indicates one of the business activity records;

the IAM data model further defines a business process entity and a relationship between the business process entity and the business activity entity, wherein the set of database records further comprises (h) a set of business process records, each business process record conforming to the business process entity and corresponding to a business process of the enterprise, and wherein one or more business activity records of the set of business activity records indicates one of the business process records; and the IAM data model further defines a business function entity and a relationship between the business function entity and the business activity entity, wherein the set of database records further comprises (i) a set of business function records, each business function record conforming to the business function entity and corresponding to a business function of the enterprise, and wherein one or more business activity records of the set of business activity records indicates one of the business function records.

5. The system of claim 4 wherein the IAM data model further defines a logical permission entity, a first relationship between the logical permission entity and the logical computing resource entity, and a second relationship between the logical permission entity and the business activity entity, wherein the set of database records further comprises (i) a set of logical permission records, each logical permission record conforming to the logical permission entity and indicating one of the logical computing resource records, and wherein one or more business activity records of the set of business activity records indicates one of the logical permission records.

6. The system of claim 5 wherein the IAM data model further defines a job function entity and a relationship between the job function entity and the business activity entity, and wherein the set of database records further comprise (j) a set of job function records, each job function record conforming to the job function entity, corresponding to a job function of the enterprise, and indicating one of the business activity records.

7. A computer-implemented method for managing identity and access management (IAM) data comprising:
implementing, at a data store, an IAM data model that models an IAM domain space using a common IAM data format, the IAM data model defining a logical computing resource entity, a physical computing resource entity, and a relationship between the logical computing resource entity and the physical computing resource entity;
receiving heterogeneous IAM data from a plurality of IAM data sources;
mapping the heterogeneous IAM data based on the IAM data model in order to obtain homogeneous IAM data formatted according to the common IAM data format;
storing the homogeneous IAM data at the data store that implements the IAM data model as a set of database records conforming to the IAM data model, the set of database records comprising (a) a set of physical computing resource records, each physical computing resource record conforming to the physical computing resource entity and corresponding to one of a plurality of physical computing resources of a computing system, and (b) a set of logical computing resource records, each logical computing resource record conforming to the logical computing resource entity and indicating at least one of the plurality of physical computing resources that implements the logical computing resource at the computing system; and changing, by an access request manager, access rights for a user account using the IAM data model by:
i) receiving a request to change access rights for the user account, wherein the request indicates one of a job function, a business activity, or a business unit,
ii) evaluating the homogenous IAM data to identify a logical computing resource associated with the job function, the business activity, or the business unit indicated in the request, and to identify a logical permission to change with respect to the logical computing resource identified,
iii) evaluating the homogenous IAM data to identify a physical computing resource that implements the logical computing resource identified,
iv) obtaining, from the homogenous IAM data, a physical permission specification associated with the physical computing resource identified, the physical permission specification mapping the logical permission to at least one physical permission that implements the logical permission at the physical computing resource, and
v) initiating a change to the access rights for the user account with respect to the physical computing resource identified based on the at least one physical permission of the physical permission specification wherein the change to the access rights either provisions the at least one physical permission to the physical computing resource for the user account or revokes the at least one physical permission to the physical computing resource from the user account.

8. The method of claim 7 further comprising:
transforming the homogeneous IAM data into reformatted IAM data having a format specified by a data analysis tool; and
providing the reformatted IAM data to the data analysis tool.

9. The method of claim 7 wherein:
the IAM data model further defines a business activity entity, a job function entity, and a relationship between the business activity entity and the job function entity;
the IAM data model further defines a logical permission entity and a relationship between the logical permission entity and the logical computing resource entity;
the set of database records further comprises (c) a set of business activity records, each business activity record conforming to the business activity entity and corresponding to a business activity of an enterprise that provides the computing system;
the set of database records further comprises (d) a set of job function records, each job function record conforming to the job function entity, corresponding to a job function of the enterprise, and indicating one of the business activity records; and
the set of database records further comprises (e) a set of logical permission records, each logical permission record conforming to the logical permission entity, indicating one of the logical computing resource records, and indicating a logical permission associated with a logical computing resource that corresponds to the logical computing resource record indicated.

10. A non-transitory computer-readable medium having instructions stored thereon that, when executed, cause a computing device to perform steps comprising:

implementing, at a data store, a data model for managing identity and access management (IAM) data, the data model defines:
a logical computing resource entity,
a physical computing resource entity, and
a relationship between the physical computing resource entity and the logical computing resource entity;
storing, at the data store, the IAM data as a set of database records, the set of database records conforming to the data model, the set of database records comprising:
(a) a set of physical computing resource records, each physical computing resource record conforming to the physical computing resource entity and corresponding to one of a plurality of physical computing resources of a computing system, and
(b) a set of logical computing resource records, each logical computing resource record conforming to the logical computing resource entity and indicating at least one of the plurality of physical computing resources that implements the logical computing resource at the computing system,
changing access rights for a user account by:
i) receiving a request to change access rights for the user account, wherein the request indicates one of a job function, a business activity, or a business unit,
ii) evaluating the IAM data to identify a logical computing resource associated with the job function, the business activity, or the business unit indicated in the request, and to identify a logical permission to change with respect to logical computing resource identified,
iii) evaluating the IAM data to identify a physical computing resource that implements the logical computing resource identified,
iv) obtaining, from the IAM data, a physical permission specification associated with the physical computing resource identified, the physical permission specification mapping the logical permission to at least one physical permission that implements the logical permission at the physical computing resource, and
v) initiating a change to the access rights for the user account with respect to the physical computing resource identified based on the at least one physical permission of the physical permission specification wherein the change to the access rights either provisions the at least one physical permission to the physical computing resource for the user account or revokes the at least one physical permission to the physical computing resource from the user account.

11. The non-transitory computer-readable medium of claim 10 wherein:
the data model further defines a business task entity, and wherein the set of database records further comprises (c) a set of business task records, each business task record conforming to the business task entity and corresponding to a business task of an enterprise that provides the computing system;
the data model further defines a business activity entity and a relationship between the business activity entity and the business task entity, wherein the set of database records further comprises (d) a set of business activity records, each business activity record conforming to the business activity entity and corresponding to a business activity of the enterprise, and wherein one or more business task records of the set of business task records indicates one of the business activity records;
the data model further defines a business process entity and a relationship between the business process entity and the business activity entity, wherein the set of database records further comprises (e) a set of business process records, each business process record conforming to the business process entity and corresponding to a business process of the enterprise, and wherein one or more business activity records of the set of business activity records indicates one of the business process records;
the data model further defines a business function entity and a relationship between the business function entity and the business activity entity, wherein the set of database records further comprises (f) a set of business function records, each business function record conforming to the business function entity and corresponding to a business function of the enterprise, and wherein one or more business activity records of the set of business activity records indicates one of the business function records; and
the data model further defines a job function entity and a relationship between the job function entity and the business activity entity, and wherein the set of database records further comprise (g) a set of job function records, each job function record conforming to the job function entity, corresponding to a job function of the enterprise, and indicating one of the business activity records.

12. The non-transitory computer-readable medium of claim 11 wherein the data model further comprises:
the data model further defines an account entity, and wherein the set of database records further comprises (h) a set of account records, each account record conforming to the account entity and corresponding to one of a plurality of user accounts of the computing system; and
the data model further defines a physical entitlement entity, a physical permission entity, a first relationship between the physical entitlement entity the physical permission entity, and a second relationship between the physical entitlement entity and the account entity, and wherein the set of database records further comprises (d) a set of physical permission records, each physical permission record corresponding to the physical permission entity and indicating a physical permission associated with one of the plurality of physical computing resources and (i) a set of physical entitlement records, each physical entitlement record conforming to the physical entitlement entity and indicating one of the account records and one of the physical permission records.

* * * * *